US006661942B1

(12) United States Patent
Gharavi

(10) Patent No.: US 6,661,942 B1
(45) Date of Patent: Dec. 9, 2003

(54) MULTI-FUNCTIONAL OPTICAL SWITCH (OPTICAL WAVELENGTH DIVISION MULTIPLEXER/DEMULTIPLEXER, ADD-DROP MULTIPLEXER AND INTER-CONNECT DEVICE) AND ITS METHODS OF MANUFACTURE

(75) Inventor: Alireza Gharavi, Chicago, IL (US)

(73) Assignee: Trans Photonics, LLC, Chicago, IL (US)

( * ) Notice: Subject to any disclaimer, the term of this patent is extended or adjusted under 35 U.S.C. 154(b) by 0 days.

(21) Appl. No.: 09/357,201

(22) Filed: Jul. 20, 1999

Related U.S. Application Data

(60) Provisional application No. 60/093,474, filed on Jul. 20, 1998, now abandoned.

(51) Int. Cl.[7] .............................. G02B 6/00; G02B 6/02; G02B 6/12
(52) U.S. Cl. ........................ 385/16; 385/37; 385/122; 385/143; 385/145
(58) Field of Search ................... 385/16–23, 130, 385/132, 143, 145, 122, 4–8, 11–14, 147, 33, 116, 1–3, 10

(56) References Cited

U.S. PATENT DOCUMENTS

| | | |
|---|---|---|
| 4,624,872 A | 11/1986 | Stuetz |
| 4,746,186 A | 5/1988 | Nicia |
| 4,752,108 A | 6/1988 | Vollmer |
| 4,757,130 A | 7/1988 | DeMartino |
| 4,766,171 A | 8/1988 | DeMartino |

(List continued on next page.)

FOREIGN PATENT DOCUMENTS

| | | |
|---|---|---|
| EP | 0 218 938 | 4/1987 |
| EP | 0 231 770 | 8/1987 |

(List continued on next page.)

OTHER PUBLICATIONS

"Features, Dec. 1997: Polyimide Provides Stable, Low–Cost Integrated Optics", p. 1–7, from www.lightwavemicro.com, updated Sep. 1, 1998.
"Special Report, Feb. 1998: High–Speed Optical Interconnects", pp. 1–5, from www.broadband–guide.com/lw/reports/report02981.html, updated Jan. 11, 1999.
SPIE Proceedings Abstracts, "Nonlinear Optical Properties of Organic Materials VII", www.spie.org/web/abstracts/2200/2285.html, dated Dec. 13, 1999, Paper No. 2285–41 (p. 14), Paper No. 2285–47 (p. 16), Paper No. 2285–49 (p. 17), and Paper No. 2285–51 (p. 18).

(List continued on next page.)

Primary Examiner—Frank G. Font
Assistant Examiner—Michael P Mooney
(74) Attorney, Agent, or Firm—Marshall, Gerstein & Borun LLP

(57) ABSTRACT

The invention provides a multifunctional optical switch that among other things, optionally can function as an optical wavelength division multiplexer, wavelength division demultiplexer, add-drop multiplexer and/or inter-connect device. The invention further provides novel methods of manufacturing the optical switch. The optical switch can comprise a single layer, and optimally includes of a plurality of layers which each comprise an optical nonlinear second-order polymer. The optical nonlinear second-order polymer present in each layer differs from that present in any other layer in terms of its absorption maximum (i.e., due to possession of different chromophores).

28 Claims, 11 Drawing Sheets

U.S. PATENT DOCUMENTS

| | | |
|---|---|---|
| 4,767,169 A | 8/1988 | Teng et al. |
| 4,792,670 A | 12/1988 | Fukaya et al. |
| 4,795,664 A | 1/1989 | DeMartino |
| 4,815,843 A | 3/1989 | Tiefenthaler et al. |
| 4,838,634 A | 6/1989 | Bennion et al. |
| 4,851,502 A | 7/1989 | DeMartino |
| 4,855,376 A | 8/1989 | De Martino et al. |
| 4,880,752 A | 11/1989 | Keck et al. |
| 4,898,691 A | 2/1990 | Borzo et al. |
| 4,917,455 A | 4/1990 | Soane |
| 4,936,645 A | 6/1990 | Yoon et al. |
| 4,978,476 A | 12/1990 | Allen et al. |
| 5,002,361 A | 3/1991 | DeMartino et al. |
| 5,006,285 A | 4/1991 | Thackara et al. |
| 5,007,696 A | 4/1991 | Thackara et al. |
| 5,044,725 A | 9/1991 | DeMartino et al. |
| 5,061,048 A | 10/1991 | Hayden et al. |
| 5,076,658 A | 12/1991 | Hayden et al. |
| 5,081,012 A | 1/1992 | Flanagan et al. |
| 5,093,883 A | 3/1992 | Yoon et al. |
| 5,103,492 A | 4/1992 | Ticknor |
| 5,105,298 A | 4/1992 | Schellenberg |
| 5,106,211 A | 4/1992 | Chiang et al. |
| 5,135,876 A | 8/1992 | Andrade et al. |
| 5,161,039 A | 11/1992 | Schellenberg |
| 5,196,509 A | 3/1993 | Allen |
| 5,200,552 A | 4/1993 | Urano et al. |
| 5,212,269 A | 5/1993 | Fischer et al. |
| 5,264,507 A | 11/1993 | Wiesenfeldt et al. |
| 5,274,061 A | 12/1993 | Urano et al. |
| 5,286,803 A | 2/1994 | Lindsay et al. |
| 5,298,588 A | 3/1994 | Gibbons et al. |
| 5,317,429 A | 5/1994 | Mochizuki et al. |
| 5,318,729 A | 6/1994 | Kurihara et al. |
| 5,319,492 A | 6/1994 | Dorn et al. |
| 5,322,986 A | 6/1994 | Nutt |
| 5,393,645 A | 2/1995 | Etzbach et al. |
| 5,434,231 A | 7/1995 | Wiesenfeldt et al. |
| 5,450,511 A | 9/1995 | Dragone |
| 5,459,232 A | 10/1995 | Sotoyama et al. |
| 5,461,131 A | 10/1995 | Wiesenfeldt et al. |
| 5,465,151 A | 11/1995 | Wybourne et al. |
| 5,465,310 A | 11/1995 | Kersten et al. |
| 5,471,548 A | 11/1995 | Brazas |
| 5,484,821 A | 1/1996 | Mandal et al. |
| 5,496,899 A | 3/1996 | Foll et al. |
| 5,532,320 A | 7/1996 | Tripathy et al. |
| 5,534,201 A | 7/1996 | Summers et al. |
| 5,544,268 A * | 8/1996 | Bischel et al. ................. 385/4 |
| 5,555,326 A | 9/1996 | Hwang et al. |
| RE35,407 E | 12/1996 | Wiesenfeldt et al. |
| 5,581,642 A | 12/1996 | Deacon et al. |
| 5,594,075 A | 1/1997 | Reinhardt et al. |
| 5,594,093 A | 1/1997 | Sotoyama et al. |
| 5,612,449 A | 3/1997 | Sotoyama et al. |
| 5,657,406 A | 8/1997 | Ball |
| 5,659,010 A | 8/1997 | Sotoyama et al. |
| 5,663,308 A | 9/1997 | Gibbons et al. |
| 5,682,255 A | 10/1997 | Friesem et al. |
| 5,688,906 A | 11/1997 | Jen et al. |
| 5,714,304 A | 2/1998 | Gibbons et al. |
| 5,726,785 A | 3/1998 | Chawki et al. |
| 5,729,641 A | 3/1998 | Chandonnet et al. |
| 5,736,592 A | 4/1998 | DeMeuse et al. |
| 5,738,806 A | 4/1998 | Beckmann et al. |
| 5,740,287 A | 4/1998 | Scalora et al. |
| 5,744,267 A | 4/1998 | Meerholz et al. |
| 5,745,612 A | 4/1998 | Wang et al. |
| 5,745,629 A | 4/1998 | Sasaki |
| 5,748,349 A | 5/1998 | Mizrahi |
| 5,748,350 A | 5/1998 | Pan et al. |
| 5,748,811 A | 5/1998 | Amersfoort et al. |
| 5,748,815 A | 5/1998 | Hamel et al. |
| 5,757,989 A | 5/1998 | Yoshimura et al. |
| 5,777,089 A | 7/1998 | Beckmann et al. |
| 5,781,677 A | 7/1998 | Jin et al. |
| 5,783,649 A | 7/1998 | Beckmann et al. |
| 5,818,983 A | 10/1998 | Yoshimura et al. |
| 5,835,646 A | 11/1998 | Yoshimura et al. |
| 5,837,804 A | 11/1998 | Yamagishi et al. |
| 5,854,866 A | 12/1998 | Leonard |
| 5,917,980 A | 6/1999 | Yoshimura et al. |

FOREIGN PATENT DOCUMENTS

| | | |
|---|---|---|
| EP | 0 238 789 | 9/1987 |
| EP | 0 290 061 | 11/1988 |
| EP | 0 295 145 | 12/1988 |
| EP | 0 297 530 | 1/1989 |
| EP | 0 337 405 | 10/1989 |
| EP | 0 351 832 | 1/1990 |
| EP | 0 372 433 | 6/1990 |
| EP | 0 380 139 | 8/1990 |
| EP | 0 394 027 | 10/1990 |
| EP | 0 396 172 | 11/1990 |
| EP | 0 406 888 | 1/1991 |
| EP | 0 413 903 | 2/1991 |
| EP | 0 435 456 | 7/1991 |
| EP | 0 436 115 | 7/1991 |
| EP | 0 478 268 | 4/1992 |
| EP | 0 488 708 A2 | 6/1992 |
| EP | 0 499 272 | 8/1992 |
| EP | 0 554 904 | 8/1993 |
| EP | 0 559 356 | 9/1993 |
| EP | 0 565 031 | 10/1993 |
| EP | 0 583 042 | 2/1994 |
| EP | 0 583 417 | 2/1994 |
| EP | 0 587 228 | 3/1994 |
| EP | 0 593 081 | 4/1994 |
| EP | 0 617 314 A1 | 9/1994 |
| EP | 0 689 067 | 12/1995 |
| EP | 0 727 692 A2 | 8/1996 |
| EP | 0 727 692 | 8/1996 |
| EP | 0 733 920 A2 | 9/1996 |
| EP | 0 766 123 | 4/1997 |
| EP | 0 778 479 | 6/1997 |
| WO | WO 98/40783 | 9/1998 |

OTHER PUBLICATIONS

EP 0 514 857 published May 20, 1992 (including English language claims) and attached English language abstract.

EP 0 604 841 A1 published Jul. 6, 1994 and attached English language abstract (NERAC Abstract WNDABSM).

Chen et al., "Two–Step Synthesis of Side–Chain Polyimides for Second–Order Nonlinear Optics", *Macromolecules*, 29 (2), 535–539 (1996).

Hikita et al., "Optical intensity modulation in a vertically stacked coupler incorporating electro–optic polymer," *Applied Physics Letters*, 63, 1161–1163 (1993).

Miller et al., "Substituted Azole Derivatives as Nonlinear Optical Chromophores," *J. Chem. Mater.*, 6, 1023–1032 (1994).

Moylan et al., "Nonlinear Optical Chromophores with Large Hyperpolarizabilities and Enhanced Thermal Stabilities," *J. Am. Chem. Soc.* 12599–12600 (1993).

Moylan et al., "Characterization of Nonlinear Optical Chromophores in Solution," *American Chemical Society*, 66–81 (1995).

Saadeh et al., "Polyimides with a Diazo Chromophore Exhibiting High Thermal Stability and Large Electrooptic Coefficients," *Macromolecules, 30* (18), 5403–5407 (1997).

Yu et al., "Novel Second–Order Nonlinear Optical Polyimides," *Society of Photooptical Instrumentation Engineers, 2527*, 127–136.

Yu et al., "Design and Synthesis of Functionalized Polyimides for Second–Order Nonlinear Optics," *Macromolecules, 27* (23), 6718–6721 (1994).

Yu et al., "A Generic Approach to Functionalizing Aromatic Polyimides for Second–Order Nonlinear Optics," *Macromolecules, 28* (3), 784–786 (1995).

Yu et al., "Novel Second–Order Nonlinear Optical, Aromatic, and Aliphatic Polyimides Exhibiting High–Temperature Stability," *Applied Physics Letters, 66*, 1050–1052 (1995).

"Dialog Database Abstract for JP 6214275" (Accession No. 10020459).

"Dialog Database Abstract for JP 8262246" (Accession No. 11012351).

"Dialog Database Abstract for JP 9022035" (Accession No. 11164080).

"Dialog Database Abstract for JP 9090153" (Accession No. 11285129).

"Dialog Database Abstract for JP 9318982" (Accession No. 11674374).

Barrett, et al., "Photoinscription of Channel Waveguides and Grating Couplers in Azobenzene Polymer This Films" SPIE., 3006: 441–449.

Sotoyama, et al., "Directional–Coupled Optical Switch between Stacked Waveguide Layers Using Electro–Optic Polymer," *Japanese Journal of Applied Physics, 31* (8B), L1180–L1181 (1992).

\* cited by examiner

MULTI-FUNCTIONAL OPTICAL SWITCH (OPTICAL WAVELENGTH DIVISION MULTIPLEXER/DEMULTIPLEXER, ADD-DROP MULTIPLEXER AND INTER-CONNECT DEVICE) AND ITS METHODS OF MANUFACTURE

CROSS REFERENCE TO RELATED APPLICATIONS

This application claims the priority of U.S. patent application Ser. No. 60/093,474 filed Jul. 20, 1998, now abandoned.

GOVERNMENT RIGHTS IN THE INVENTION

The invention was made with Government support under Agreement No. DASG60-98-M0158, awarded by the Ballistic Missile Defense Organization, U.S. Department of Defense. Accordingly, the government may have certain rights in the invention.

TECHNICAL FIELD OF THE INVENTION

The present invention pertains to a multiftnctional optical switch that can be employed inter alia as an optical wavelength division multiplexer, optical wavelength division demultiplexer, optical add-drop multiplexer and/or optical inter-connect device. The invention further provides novel methods of manufacturing the optical switch. The optical switch can comprise a single layer, and optimally includes a plurality of layers which each comprise an optical nonlinear second-order polymer. The optical nonlinear second-order polymer present in each layer preferably differs from that present in any other layer in terms of its absorption maximum (i.e., due to possession of different chromophores).

BACKGROUND OF THE INVENTION

The new century heralds an unprecedented demand for ability to transport and process large amounts of information. The incredible growth in demand for Internet resources and the constraints of bandwidth are but just two of the factors that compel the telecommunications industry to pursue less expensive and more efficient options in the form of "all-optical" networks (as well as networks that may not solely comprise, but do include, optical components).

For industries to meet such demand, further development and improvement of optoelectronic components (currently bulky and expensive) is necessary. In particular, it will be necessary to: (i) reduce the size of the optical components; (ii) increase the number of channels on a given optical fiber; and (iii) simplify the fabrication process to reduce costs. In addition, higher and higher transmission bit-rates of data are needed to expand the capability of current fiber communication channels.

Wavelength division multiplexers (WDMs) have become one of the hottest commodity items in lightwave applications today since they allow multiple wavelengths to be used as channels to transmit data within a single optical fiber. WDMs traditionally are based on inorganic materials. However, organic materials, namely polymeric materials, have recently reached a performance maturity to compete with these inorganic optical materials. Such materials exhibit physical and chemical "flexibility", and, for instance, can be relatively easily chemically modified to suit specific applications. This flexibility of polymeric materials makes possible, among other things, rapid cycles of material design, preparation, testing, and redesign. Organic polymeric materials are readily fabricated into integrated optical circuitry, which contributes to lower costs of manufacture. Polymer-based devices could ultimately be mass-produced using simple printing processes. Moreover, organic polymers provide a large inventory of photonic materials that can have a low dielectric constant. Certain of the polymers show high stability and optical nonlinearity.

In the 1990s, polymer-based interferometers and other polymer-based devices generated great interest (Girton et al. "Electrooptic Polymer Mach-Zehnder Modulator." In ACS Symposium Series 601, *Polymers for Second-Order Nonlinear Optics* (Washington D.C. 1995), 456–468). Polymeric materials have recently emerged as materials for use in optical applications (Keil, "Realization of IO-Polymer-Components and present State in Polymer Technology" *In Integrated Optics and Micro-Optics With Polymers,* (Stuttgart-Leipzig: B. G. Teubner Verlagsgesellscaft, 1993), 273; Ito et al., eds., *Polymeric Materials for Microelectronics Applications,* ACS Symposium Series 579 (Washington, D.C.: American Chemical Society, 1991); Lindsay et al., eds., *Polymers for Second Order Nonlinear Optics,* ACS Symposium Series 601 (Wash., D.C.: American Chemical Society, 1995), pp. 1, 111, 130, 158, 172, 374, 381; Edelman et al., eds.

Among the more recently developed polymeric materials are polyimides that have been shown to have superior optical and physical characteristics. In particular, certain polyimides show thermal stability, as well as high optical nonlinearity (as reflected in their $r_{33}$ values) (Lindsay et al., supra). The company Akzo Nobel uses polymers to make optical switches. Similarly, the company Lightwave has combined optical design with a polymer-materials technology and semiconductor techniques to make waveguide structures directly on a wafer where the silicon acts as a platform only. Lightwave uses a polyimide polymer having a low dielectric constant and high temperature stability. The material made by Lightwave acts as an optical pipe, but it also can be made optically active by applying a voltage across the material to change the index of refraction. Then the light can be modulated or switched from one path to another, or just modulated at very high speeds. Despite these advances, considerable advances in the optics field still need to be made to meet the recent demands of the telecommunications industry. For instance, devices constructed to date are single-layer devices, and/or are planar (i.e., the switching occurs in one plane to adjacent waveguides).

Thus, the present invention provides a novel device, i.e., an optical switch, that can perform several critical tasks for the telecommunications industry—e.g., wavelength division multiplexing, wavelength division demultiplexing, performance as an add/drop filter and/or interconnect device. The devices according to the invention conceivably can be manufactured at substantially less than the cost of the silicon-based devices due to novel means for their production, as further described herein. These and other objects and advantages of the present invention, as well as additional inventive features, will be apparent from the following description of the invention provided herein.

BRIEF SUMMARY OF THE INVENTION

The present invention pertains to a multifunctional optical switch, and novel methods for its manufacture. The optical switch can comprise a single layer, and optimally comprises a plurality of layers (i.e., at least two layers, preferably which are stacked), which desirably each comprise an optical nonlinear second-order polymer. The optical nonlinear second-order polymer present in each layer preferably differs from that present in any other layer in terms of its light absorption maximum. The optical switch according to the invention desirably can be employed as an optical wavelength division multiplexer, wavelength division demultiplexer, add-drop multiplexer and/or inter-connect device, among other things. Other uses and devices of the optical switch of the invention would be apparent to one skilled in the art.

DETAILED DESCRIPTION OF THE INVENTION

Figure 1:
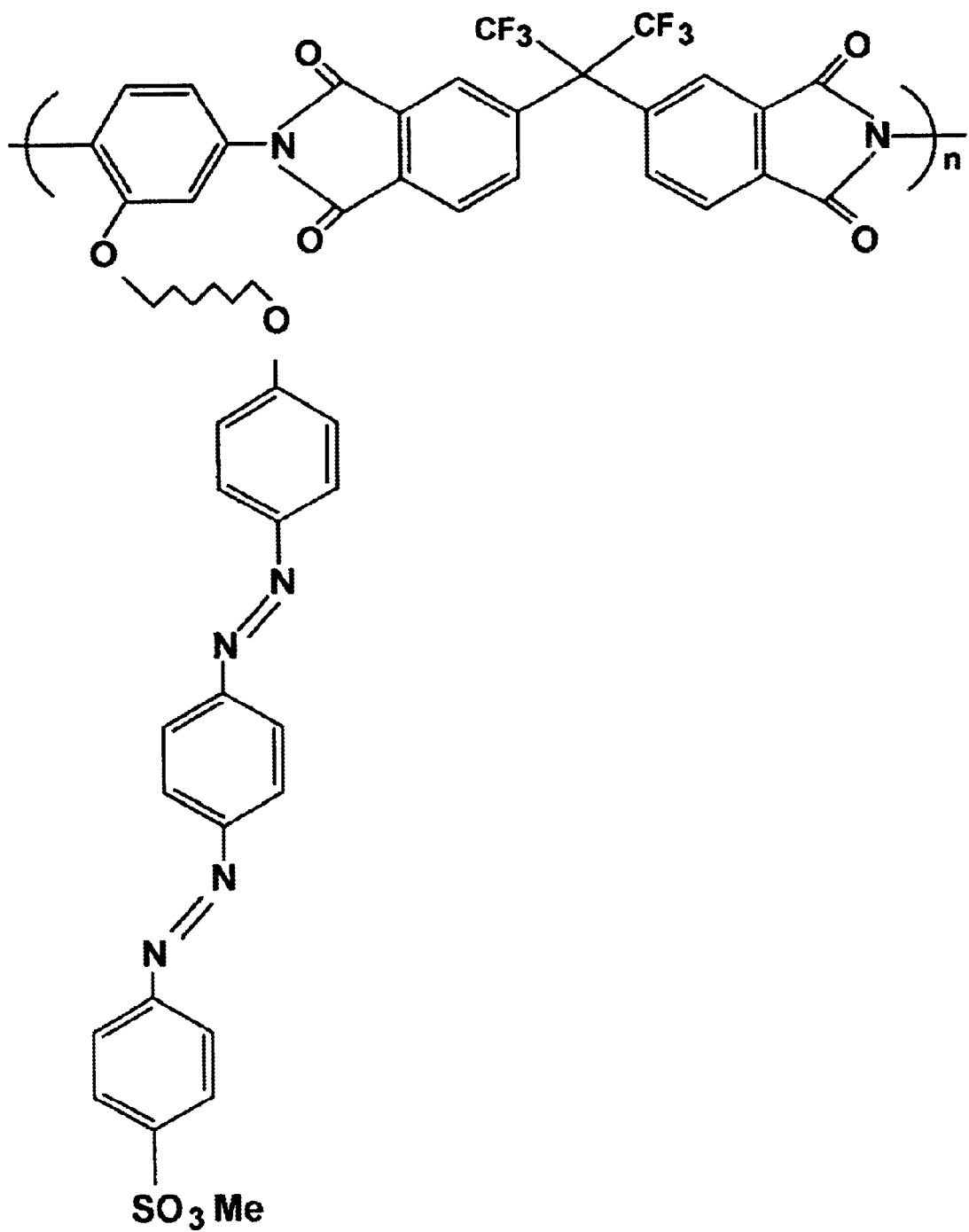
FIG. 1 depicts the chemical structure of polyimide-alkoxy sulfone diazo. Symbol: n, ranging from about 44 to about 600.

The invention pertains to a multifunctional optical switch that, among other things, desirably can function as an optical wavelength division multiplexer, optical wavelength division demultiplexer, optical add-drop multiplexer and/or optical inter-connect device. In particular, the invention pertains to an optical device, particularly an optical frequency dispersive device, such as an optical multiplexer or optical demultiplexer, which preferably receives light from one or more input waveguides and disperses it according to frequency to one or more output waveguides. The present invention also optimally pertains to an optical add/drop multiplexer and to an inter-connect device. According to the invention, preferably a "device" includes any single preferred entity as set forth herein (e.g., including, in particular, a waveguide), or any combination of elements (e.g., optical switch, optical wavelength division multiplexer, optical wavelength division demultiplexer, optical add-drop multiplexer, optical inter-connect device and the like) either alone, or, in a higher level of organization (e.g., present in a system or subsystem such as a board or motherboard). Preferably these entities are employed in optical communication systems, although each may exist in any combination, or independently, or as part of a communications system or other system that is other than predominantly optical (i.e., a mix of optical and nonoptical systems). Desirably a device according to the invention is optically active, although passive devices are also contemplated by and preferred according to the invention. However, one unifying feature of all the elements of the invention is their incorporation of a second-order nonlinear optical (2°-NLO) polymer, or a polymer having the desirable properties set forth herein, as further described below.

Certain standard terms are employed in describing the invention. Illustrative definitions of these terms are set out below, and in the Examples which follow. Should there be any term that is left undefined, or any possible ambiguity in the meaning of a term, the broadest possible definition known in the optics/electronics fields that is consistent with the scope and goals of the invention is to be applied. Also, like numbering is used for the same components in each of the Figures and in the descriptive text.

The expression "optical communication system" or "optical system" as used herein refers to any system which employs optical signals to convey information across an optical waveguide medium. Such optical systems include, but are not limited to, telecommunications systems, cable television systems, local area networks (LANs), and the like.

A "waveguide" is an entity of material boundaries or structures for guiding electromagnetic waves. More specifically, a waveguide is an optical waveguide, or any structure capable of guiding optical power (i.e., carrying one or more optical signals).

A second-order nonlinear optical (2°-NLO) polymer is a polymer that is optically active —i.e., its index of refraction changes due to an applied electric field, and the change is proportional to the square of the applied electric field. Preferably according to the invention, a 2°-NLO polymer is obtained by the incorporation into a polymer backbone of a chromophore having 2°-NLO characteristics, and/or which exhibits those characteristics when present in the polymer backbone.

According to the invention, a waveguide is comprised of a layer of 2°-NLO polymer. Desirably the waveguide is surrounded by cladding (e.g., a glass or plastic coating) and/or a support for the NLO polymer. The cladding can include one or more layers of 2°-NLO polymer, or other material and further can include a buffer (e.g., as set out in FIG. 5). According to the invention, "a buffer" is an optical buffer, i.e., a medium that does not exhibit optical activity or optical nonlinearity. It is necessary for proper functioning of the waveguide, however, that the index of refraction in any layer surrounding the waveguide is less than the index of refraction in the waveguide itself. The index of refraction in each layer is impacted by the chromophore concentration, the nature of the chromophore, and the nature of the polymer backbone. Of course, these parameters can easily be optimized by one skilled in the art. Desirably, the waveguide can comprise any part of a circuit or optical device.

To function as a waveguide, the index of refraction in any layer surrounding the waveguide must be less than the index of refraction in the waveguide itself. This difference in refractive index between the waveguide itself and any adjacent layer (i.e., "$\Delta n$" in Example 1) preferably is equal to or greater than 0.001, and desirably is no more than 0.1. However, with alternate thicknesses of waveguide, it is conceivable that the range of differences may be slightly broader. Such alternates are contemplated by the present invention.

Thus, desirably the present invention contemplates an "asymmetric waveguide" and a "symmetric waveguide". In the case of an asymmetric waveguide, i.e., comprised of a waveguide surrounded by an upper and lower layer, the refractive indices of the upper and lower layers are not equal to each other, and are less than the refractive index of the waveguide. In the case of a symmetric waveguide, i.e., comprised of a waveguide surrounded by an upper and lower layer, the refractive indices of the upper and lower layers are equal to each other, and are less than the refractive index of the waveguide. This is further described in Example 1.

An "optical switch" is a device that is capable of changing the path of light from one waveguide to another (e.g., a multiplexer/demultiplexer, add/drop, and/or interconnect).

An "optical multiplexer" is a device which combines a plurality of optical signals having different wavelengths in a single optical fiber on the transmitting side.

An "optical demultiplexer" is a device which separates a multiplexed signal into a plurality of optical signals of different wavelengths on the receiving side. Essentially, an optical multiplexer is an optical demultiplexer run in reverse, and vice versa.

In particular, an optical "wavelength division multiplexer" ("WDM") is a system that employs WDM signals consisting of a number of different wavelength optical signals (known as "carrier signals" or "channels") to transmit information on optical fiber or in an optical waveguide. In a WDM system, optical signal channels are generated, multiplexed (i.e., added together) to form an optical signal comprised of the individual optical signal channels, transmitted over a single waveguide, and demultiplexed such that each channel wavelength is individually routed to a designated receiver. The various channels within a WDM signal can be distinguished either by their optical wavelength or their optical frequency, with these terms being used interchangeably herein as features of the optical signal.

An optical "add/drop multiplexer" (OADM) is a device which facilitates the addition and subtraction of particular carrier signals to or from the WDM signal at different locations on an optical network. For instance, such routing can occur when optical channels are sent to or withdrawn from an optical transmission line, e.g., for sending optical channels between a terminal and an optical bus, or for routing long distance telecommunications traffic to individual cities. An OADM is thus just a variation of a WDM such as is known in the art.

An "optical interconnect" (OIC) or "optical cross-connect" (OXC) provides routing of signal at the optical (wavelength) level. An OIC/OXC can route a signal from point A to point B or C. It provides wavelength management on a number of incoming and outgoing fibers, and optimally can contribute optical grooming and restoration capabilities.

An "interferometer" is an instrument that employs the interference of light waves for purposes of measurement. Any of the devices, systems, or subsystems according to the invention further preferably can incorporate or comprise an interferometer, as well as other optional components.

An "active" device according to the invention is one which responds to an applied electric field. An active device must contain at least one grating, but each waveguide present in the device (i.e., in the case of a device comprised of more than one waveguide) need not necessarily contain a grating. In other words, with an active device, its optical properties are changed when a voltage is applied to it. By comparison, a "passive" device according to the invention is one that does not change its characteristics when a voltage is applied to it, and/or a device that functions without needing to apply a voltage (i.e., and to which a voltage is not applied).

According to the invention, the electric field is generated with any appropriate power source (e.g., AC or DC power source), and communicated to the device or switch by means of an electrode. The electrode used in the present invention preferably is made of at least one of the following materials: metals such as gold, silver, platinum, copper, and alloys; conductive materials such carbon black, conductive epoxy, or indium tin oxide (ITO). However, any electrode having the ability to conduct charge and capable of functioning as an "electrode" as that term is understood in the art can be employed in the methods and devices of the invention. Generally, an electrode need only supply a small amount of voltage, e.g., from 0 to about 50 volts, although in certain applications, it may be preferable to employ a higher voltage.

According to this invention, a "grating" is a means of separating an optical signal. A particularly preferred grating for use in the invention is a Bragg-Grating. A "Bragg-Grating" is an element for selectively controlling specific wavelengths of light within a waveguide. A typical Bragg-Grating contains a length of waveguide that includes a plurality of periodic perturbations in the index of refraction, wherein the perturbations are substantially equally spaced along the length of the waveguide. These perturbations selectively reflect light having a wavelength ($\lambda$) equivalent to twice the spacing ($\Lambda$) between the successive perturbations (i.e., $\lambda=2n_{eff}\Lambda$, where $\lambda$ is the vacuum wavelength and $n_{eff}$ is the effective refractive index of the propagating mode). The light that is not selectively reflected by the Bragg-Grating passes through the grating unimpeded.

Figure 8:
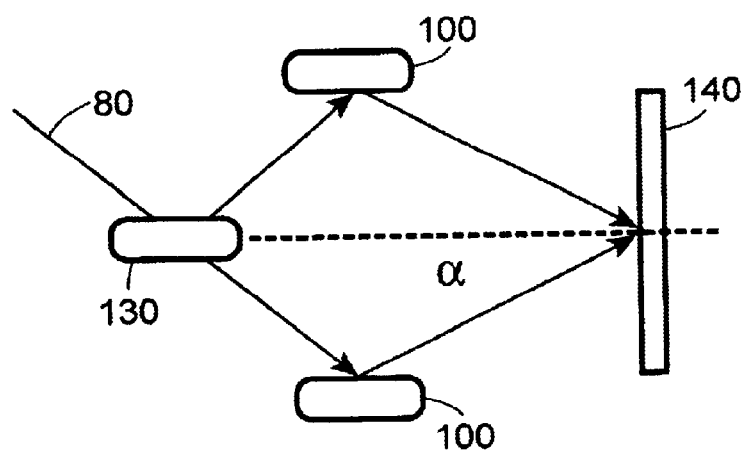
FIG. 8 depicts holographic grating formation using two overlapping laser beams which intersect at α in the polymeric waveguide material. Symbols: 80, laser beam; 100, mirror; 130, beam splitter; 140, polymeric material.

Conventional gratings such as the Fiber Bragg-Grating are typically manufactured by using a waveguide (e.g., an optical fiber) that includes one or more elements in their core that are sensitive to ultraviolet light, and then exposing the waveguide at periodic intervals to high intensity ultraviolet light (or other appropriate light), e.g., from an excimer laser. Generally, the appropriate periodic spacing of perturbations in a grating is accomplished with use of some sort of physical mask to adjust areas exposed to the laser (e.g., a photo mask), a phase mask, or a pair of interfering beams (e.g., holographic techniques). Further preferred approaches for generation of a grating according to the invention, particularly a Bragg-Grating, are described below, and in the Examples which follow, as well as are illustrated in FIG. 8. However, other means of grating generation known in the art optionally can be employed.

In particular, preferably the present invention provides an active Bragg-Grating multiplexer (desirably produced via optical waveguide writing techniques such as photobleaching and laser writing as further described herein), in thin layers fabricated from soluble, second-order nonlinear optical (2°-NLO) polymers. The invention further provides a demultiplexer, OADM, an OIC/OXC, and other active and passive devices. Preferably such devices according to the invention comprise a single layer of 2°-NLO, and optimally comprise more than one layer of the 2°-NLO, especially from two to ten layers of different 2°-NLOs, desirably from two to six layers of different 2°-NLOs, and particularly two or three layers of different 2°-NLOs. When more than a single layer of 2°-NLO is present, optimally according to the invention the layers are "stacked" (although a side-by-side juxtaposition also can be employed). Desirably the optical switch devices as described above further comprise one or more buffer layers, as well as other optional components (e.g., interferometer). Preferably, the grating(s) (e.g., Bragg-Grating(s)) are present in the buffer layer(s) and/or the waveguide layer(s) comprised of 2°-NLOs.

Preferably the 2°-NLOs employed in the invention (or other appropriate polymer) exhibit thermal and mechanical stability, and high optical non-linearity. Desirably the 2°-NLO does not suffer thermal decomposition until above about 300° C. Optimally the 2°-NLO has a large electro-optic coefficient ($r_{33}$) ranging anywhere from between about 5 to about 40 picometer/volt (e.g., as reported in the literature).

It particularly is preferred according to the invention that the 2°-NLO is a polyimide, i.e., having as a "polymer backbone" poly [N, N (1,4 phenylene)-4,4' (hexa fluoroisopropylidene) diphthalic imide] depicted as "Z" in Structure I below and hereafter referred to generally as "polyimide" (although "S" and "C" present in the polyimide may differ, and are further described below):

Structure I

In Structure I, the preferred structure of the 2°-NLO polymer according to the invention, the polymer backbone is attached to a spacer, "S", which itself is attached to a chromophore "C", each of which is further described below. The polyimide according to the invention optionally can be modified or substituted if beneficial for a particular application, so long as such modification/substitution allows functionality within the spirit and scope of the invention (e.g., does not substantially negate the optical neutrality of the polyimide).

In situations where it is not necessary that the polymer backbone exhibit thermal stability above 300° C., the polymer backbone can comprise the following polymers (or other polymers) instead of polyimide, and which have the thermal glass transition values (° C.) indicated: Poly(methyl methacrylate), 114; Polystyrene, 100; Poly(p-hydroxystyrene), 150; Polycarbonate, 150; Polyester, 38-130; Polyurethane, 140; Poly(phenylene vinylene), 40; Polyquinoline, 175; Polyamide, 276; Polyimide, 310. Thus, desirably according to the invention, these other polymers can be employed instead of polyimide as the polymer backbone "Z".

In particular, however, preferably the polymer backbone "Z" is polyimide, i.e., having Structure II ($M_w$ of about 454) depicted below:

Structure II

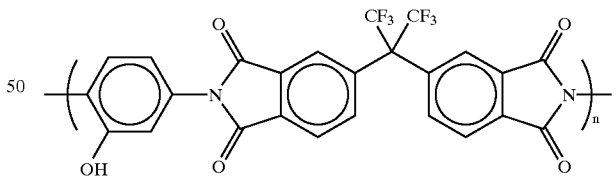

where n preferably is any number ranging from about 44 to about 600, and desirably ranges from about 100 to about 300. Generally it is found that longer chains (i.e., where n is greater than 44) give better properties in the sense that the chains intertangle better. Too great of a chain length, however, deleteriously impacts polymer solubility.

It further is desirable according to the invention that the polymer backbone "Z" is a polyamic acid having Structure III depicted below, and which upon heating becomes insoluble in organic solvents:

Structure III

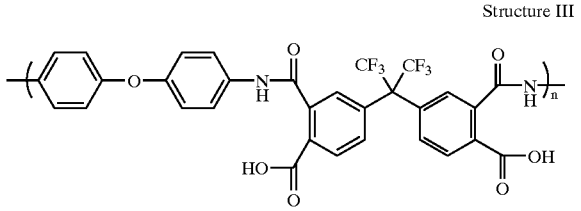

where n preferably is any number ranging from about 44 to about 600, and desirably ranges from about 100 to about 300.

The spacer, "S", in Structure I preferably is a chain of from 0 to 30 carbons (or other moieties) which provide optimal spacing such that the polymer backbone is appropriately attached to, and does not interfere with, the functionality of the chromophore ("C"). In particular, preferably the spacer has a length of from 1 to 10 atoms, and even more desirably, from 2 to 6 atoms. However, the spacer must be of sufficient length and character such that it does not interfere with the function of (e.g., the conjugation of) the attached chromophore, as well as does not interfere with the 2°-NLO properties of the polymer. A preferred spacer according to the invention is oxytrimethylene spacer.

With regard to the chromophore, "C," the 2°-NLOs polyimide with chemically attached (i.e., polyimide-alkoxy sulfone diazo) or doped sulfone diazo (Mordant Orange 10, purchased from Sigma-Aldrich Fine Chemicals, St. Louis, Mo.), chromophore, polyimide-dialkylamino nitro azo, and polyimide-dialkyl amino nitro diazo (see, Saaedeh et al., "Polyimides with a Diazo Chromophore Exhibiting High Thermal Stability and Large Electrooptic Coefficients", *Macromolecules*, 30 (18), 5403–5407 (1997); Yu et al., "Novel Second-Order Nonlinear Optical, Aromatic and Aliphatic Polyimides Exhibiting High-Temperature Stability", *Applied Physics Letters*, 66, 1050–1052 (1995); Yu et al., "Novel Second-Order Nonlinear Optical Polyimides," *Society of Photooptical Instrumentation Engineers*, 2527, 127–136) are especially preferred for use in the invention. These polyimides incorporate the chromophores dialkyl amino nitro azo (e.g., present in polyimide-dialkyl amino nitro azo), sulfone diazo (e.g., present in polyimide-sulfone diazo), and dialkyl amino nitro diazo (e.g., present in polyimide-dialkyl amino nitro diazo). These polyimides (as well as other polyimides, or other polymers appropriate for optical applications) optimally can be modified by the incorporation of different chromophores into the polyimide backbone, allowing the responsiveness of the 2°-NLO to different wavelengths of light to differ.

Such modification of the polyimide backbone with different chromophores is known in the art, and is described, for instance, in Marder et al., *Nature, 388, 845–851* (1997). The chromophore incorporated in the polyimide can be any chromophore, but desirably is a chromophore including, but not limited to: (a) the three chromophores previously described, and (b) those chromophores depicted in Table 1. In Table I below, "$\mu$" is the dipolar moment of the molecule, "$\beta$" is the hyperpolarizability, and "$\lambda$" is the wavelength.

TABLE 1

| | Structure | | $\mu\beta \times 10^{48}$ (esu) | $\lambda_{max}$ (nm) |
|---|---|---|---|---|
| 1 | NMe₂—⟨phenyl⟩—(CH=CH)ₙ—⟨phenyl⟩—NO₂  n = 2 to 4 | n = 2  n = 3  n = 4 | 813  1074  1700 | 442  458  464 |
| 2 | Me₂N—⟨phenyl⟩—N=N—⟨phenyl⟩—NO₂ | | 751 | 480 |
| 3 | NPh₂N—⟨phenyl⟩—N=N—⟨phenyl⟩—NO₂ | | 788 | 486 |
| 4 | Et₂N—⟨phenyl⟩—N=N—⟨phenyl⟩—NO₂ | | 996 | 494 |
| 5 | NPh₂N—⟨phenyl⟩—N=N—⟨phenyl⟩—CHC(CN)₂ | | 1360 | 526 |

TABLE 1-continued

| | Structure | $\mu\beta \times 10^{48}$ (esu) | $\lambda_{max}$ (nm) |
|---|---|---|---|
| 6 | NPh₂N—⟨⟩—N=N—⟨⟩—C₂(CN)₃ | 2776 | 602 |
| 7 | Et₂N—⟨⟩—N=N—⟨⟩—N=N—⟨⟩—NO₂ | 19000 | 504 |
| 8 | Et₂N—⟨⟩—N=N—⟨⟩—N=N—⟨⟩—C₂(CN)₃ | 24000 | — |
| 9 | MeO—⟨⟩—C≡C—benzothiazole—NO₂ | 276 | 362 |
| 10 | NPh₂—⟨⟩—CH=CH—benzothiazole—NO₂ | 756 | 458 |
| 11 | NPh₂—⟨⟩—N=N—benzothiazole—NO₂ | 1390 | 550 |
| 12 | (dimethylphenyl)-N=N-(dimethylphenyl)-N=N-(hydroxynaphthyl) | — | 518 |

Desirably the chromophore employed in the invention has an absorption wavelength from between about 200 nm and about 800 nm, preferably from between about 300 nm and about 600 nm. The preferred chromophores according to the invention also desirably have an effective cis-trans isomerization process when excited at their absorption wavelengths. Also, desirably the chromophores are such that polarization alone can be used to induce alignment in the chromophores (e.g., as described in Rochon et al., "Optically Induced and Erased Birefringence and Dichroism in Azoaromatic Polymers", *Appl. Phys. Lett.* 60, pages 4–5 (1992); Kim et al., "Laser Induced Holographic Surface Relief gratings on Nonlinear Optical Polymer Films", *Appl. Phys. Lett.* 66, pages 1166–1168, (1995)). Optimally this induced alignment will be in the direction to reduce interaction with the incident polarized light.

According to the invention, and, as further described below, a waveguide that exhibits 2°-NLO properties can be obtained not only by chemical conjugation of a 2°-NLO chromophore into a polymer backbone, but also desirably can be obtained by merely mixing a 2°-NLO chromophore with a polymer backbone in a process commonly known as "doping". For "doping" it is preferably that the concentration of the chromophore be between about 3% and about 10% of the total polymer mixture. Other variations such as would be obvious to one skilled in the art are contemplated by the invention.

Figure 2:
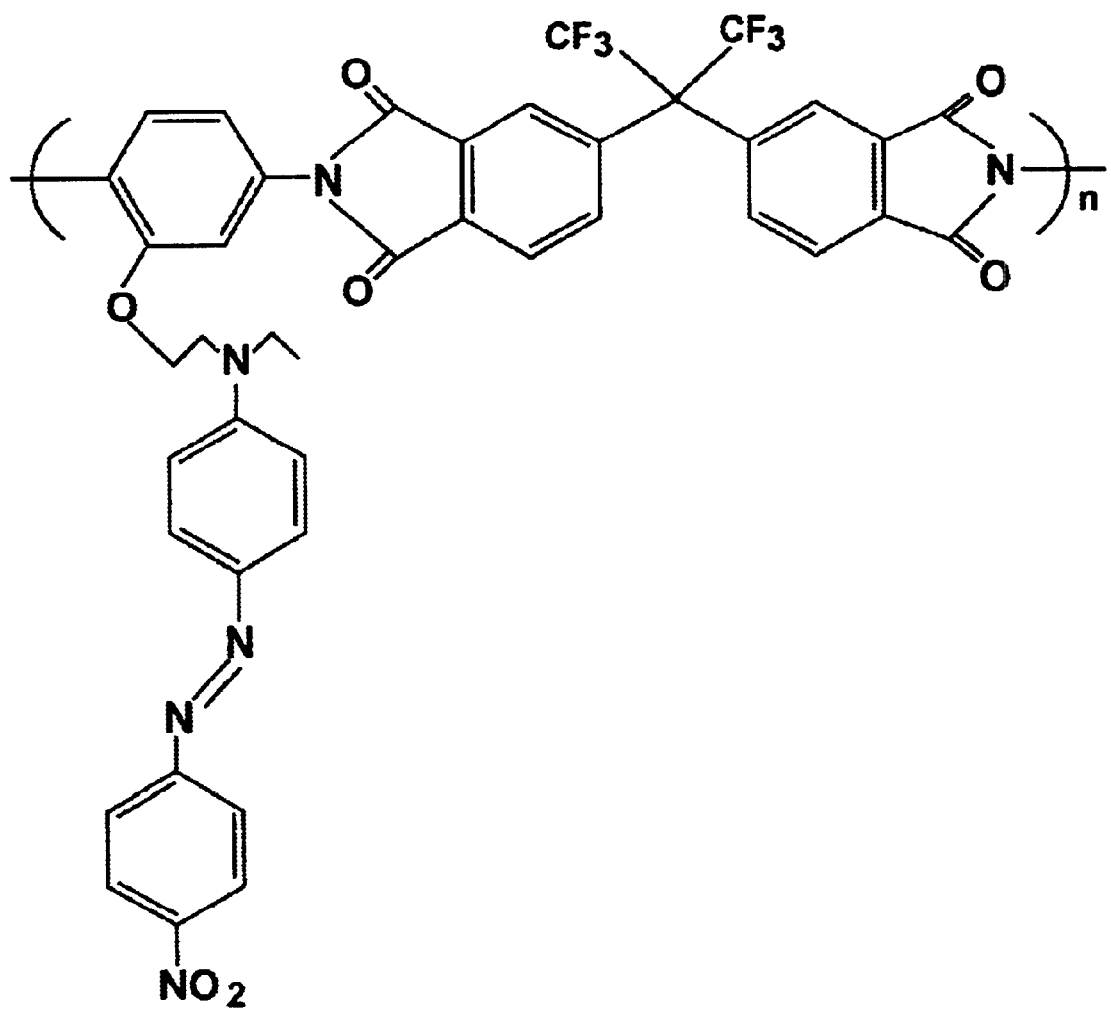
FIG. 2 depicts the chemical structure of polyimide-dialkyl amino nitro azo. Symbol: n, ranging from about 44 to about 600.
Figure 3:
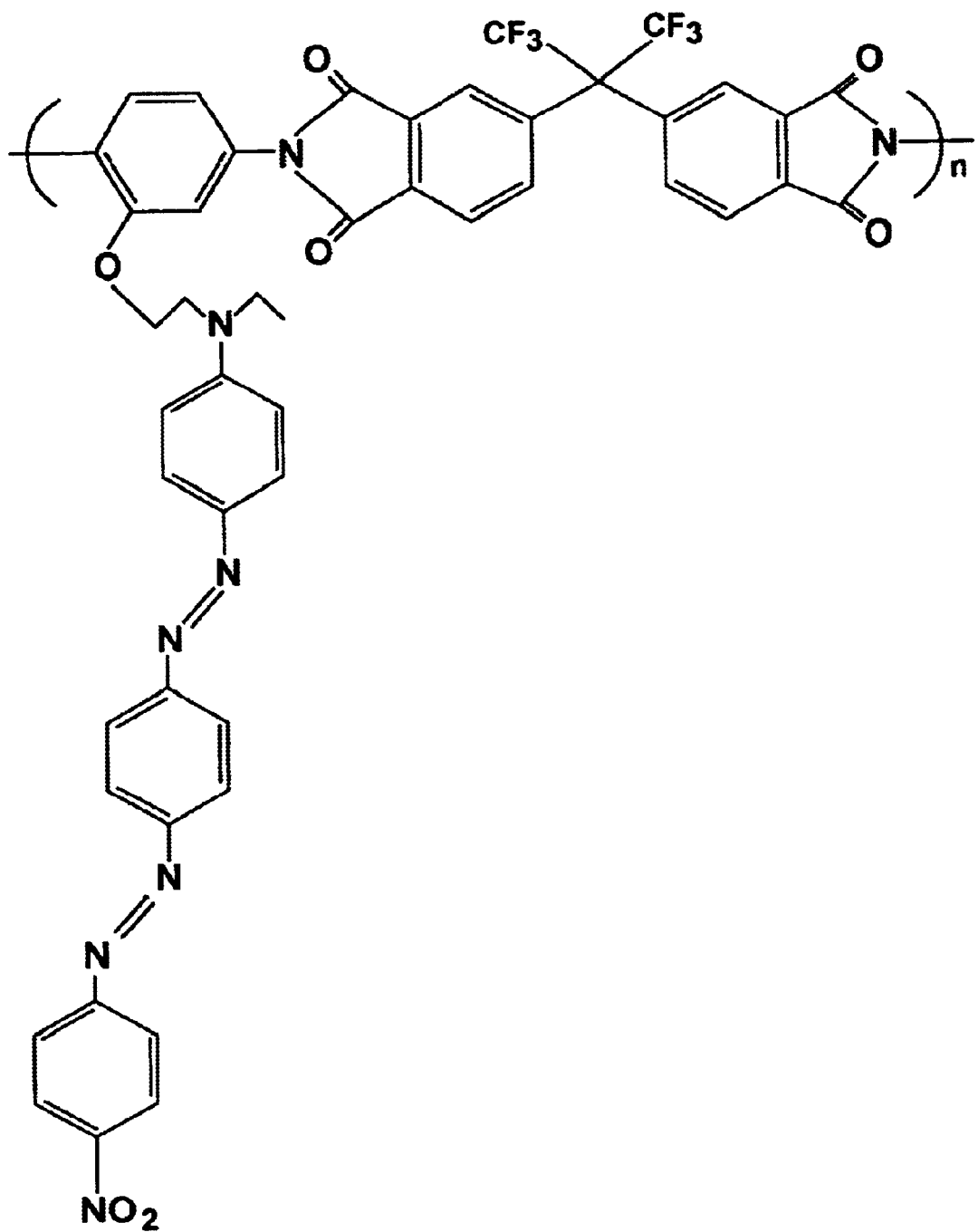
FIG. 3 depicts the chemical structure of polyimide-dialkyl amino nitro diazo. Symbol: n, ranging from about 44 to about 600.
Figure 4:
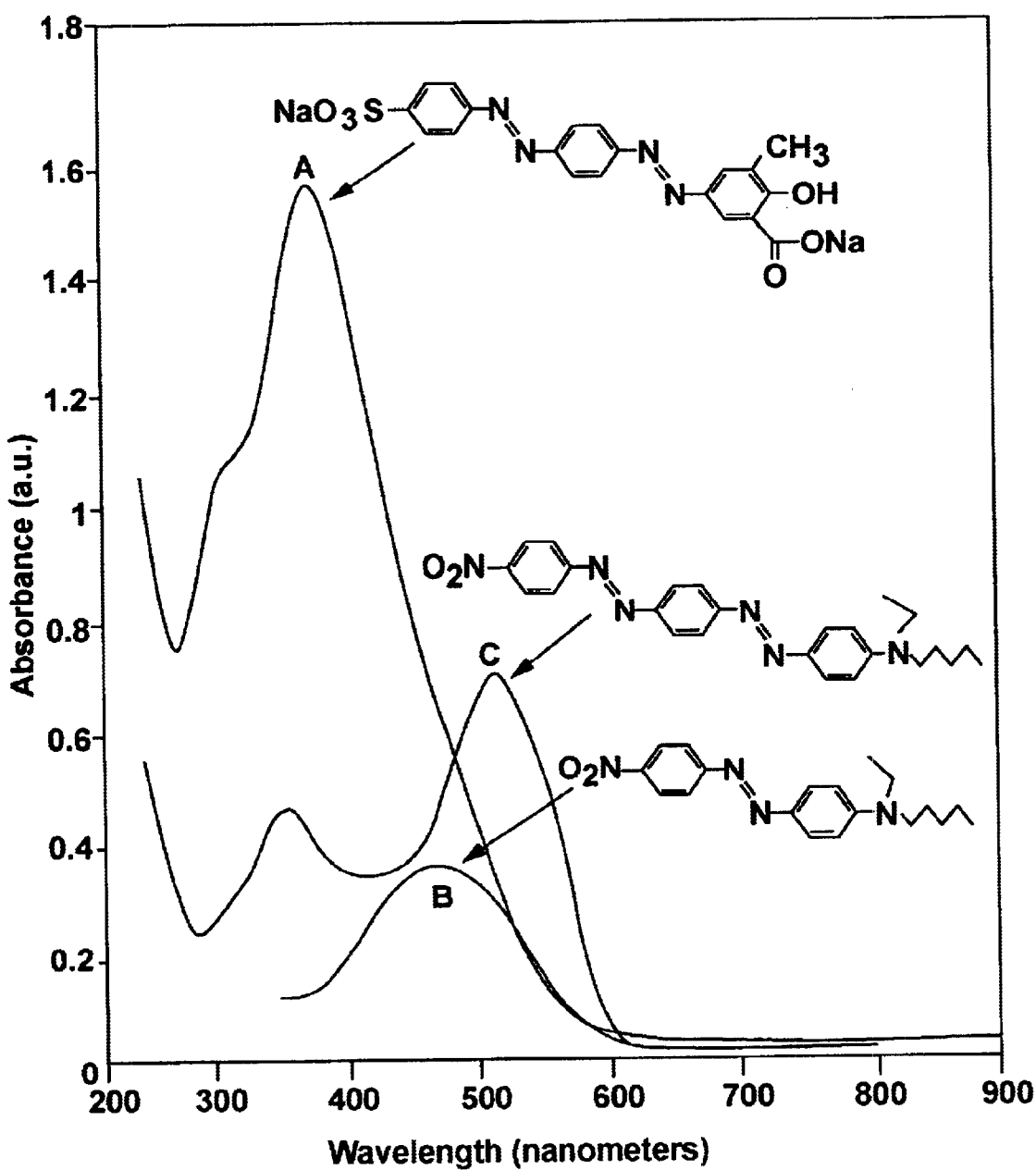
FIG. 4 shows the absorption spectra in terms of arbitrary absorbance units (0 to 1.8) at an applied wavelength (250 to 800 nm) of three second-order nonlinear optical polyimides having different pendant chromophores—i.e., sulfone diazo (Mordant Orange 10) chromophore present in a polyimide or poly(methyl methacrylate) host matrix ("A" peak), dialkyl amino nitro azo present in polyimide-dialkyl amino nitro azo ("B" peak), and dialkyl amino nitro diazo present in polyimide-dialkyl amino nitro diazo ("C" peak). For this figure, three different absorbences are superimposed. The absorbences are obtained from different thickness films and do not correspond to scale.

The chemical structures of certain of the preferred polyimides to be used for the proposed device according to the invention are shown in FIGS. 1–3, with the corresponding absorption spectra of the corresponding polymers being shown in FIG. 4. These materials provide great flexibility in terms of chemical modification, such modification which may be desirable in optimizing the properties of the polymer for use in optical applications. For instance, in dialkyl amino nitro diazo it is possible to change the electron donor in the chromophore from nitrogen to oxygen and the electron acceptor from nitro to sulfone to get the alkoxy sulfone diazo (Mordant Orange 10). This will shift the absorption of the material from 532 nm to 386 nm as shown in FIG. 4.

Therefore, by changing the pendant chromophore in the polyimide employed in the different layers of the device according to the invention, the absorption peaks for each layer can be completely separated, or single layer devices having different optical properties can be obtained. Hence, inter alia, the invention renders it possible to manipulate each layer of the polymer films by using the appropriate wavelength to induce refractive index changes. The concentration of chromophores can be carefully adjusted by copolymerization to control the refractive index at the expense of the nonlinearity (e.g., as described in Girton et al., supra, and Keil, supra).

Furthermore, with active devices, transparent electrodes can be incorporated in the form of transparent layers of Indium-Tin-Oxide ITO. Under proper conditions it can form a thin film on a glass or polymer substrate which is electrically conductive and optically transparent in the ultraviolet to infrared region of the electromagnetic spectrum. It can be deposited as a thin film layer (typically 100 nanometer thickness) using an alloy of Indium and Tin and Oxygen atmosphere by reactive sputtering techniques. Reactive sputtering techniques include DC, RF, and Magnetron sputtering, and are known to those working in the field.

Figure 14:
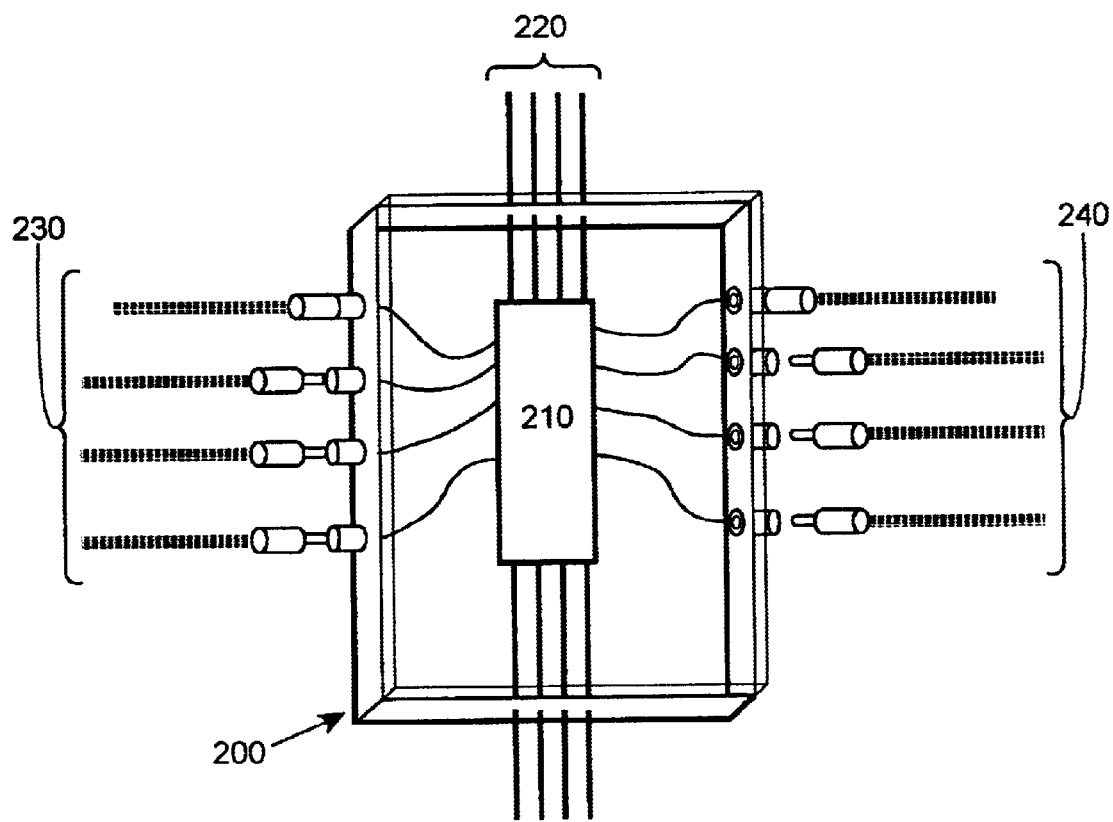
FIG. 14 depicts a sample 4×4 multiplexer/demultiplexer and cross-connect device according to the invention. Symbols: 200, enclosure box; 210, optical circuit board; 220, electrical connections; 230, input optical fibers; 240, output optical fibers.

Taking advantage of highly efficient 2°-NLO polymers that have large electro-optic coefficients (e.g., the preferred polyimides depicted in FIGS. 1–3, or other polyimides), the driving voltage for the operation of an active device according to the invention which incorporates such a 2°-NLO should also be low. The novel fabrication processes according to the invention allow the construction of multiple levels or multiple layers on the same board. According to the invention a "board" can be a simple glass substrate or a silicon chip with electronic circuits or any sort of support platform for the polymer films. The multiple levels or layers on the board are individually processed and interconnected to other layers by various means (e.g., directional and grating couplers, and/or inter-connects). By constructing such multi-layered systems, it is possible to fabricate very dense optical integrated circuits (e.g., having more than one function, such as a combination of interconnected circuit elements inseparably associated on or within a continuous substrate), if so desired. A sample board according to the invention is depicted in FIG. 14.

The methods of fabricating the novel devices of the invention desirably employ a number of novel photo-processes such as photo-induced (Rochon et al., "Optically Induced Surface Gratings on Azoaromatic Polymer Films", AppL Phys. Lett., 66, pages 136–138, (1995)), or photo-induced electric-field-assisted (Hill et al., "Reversible Optical Storage Utilizing Pulsed, Photoinduced, Electric-field-assisted Reorientation of Asobenzenes", Appl. Phys. Lett. 66, pages 2156–2158, (1995)) poling (apparatus shown in FIG. 6) and photobleaching techniques (FIG. 9) for writing gratings and waveguides (Keil, supra). These processes facilitate the fabrication by producing waveguides using lasers at the absorption wavelength of the 2°-NLO chromophores (e.g., typically between from about 300 nm to about 600 nm). The waveguides are unaffected by light with lowest wavelength outside the range of their absorption, such as at communication wavelengths of from about 1.3 to about 1.5 microns. Additionally, these processes reduce the costs dramatically and provide an easy way to fabricate integrated optical circuits.

With use of the preferred laser writing technique, desirably a holographic grating can be assembled with proper pitch to control the amount of out-coupled light with the appropriate fraction. Also, optionally the destruction of the chromophores by a well established photobleaching process (see, e.g., Rikken et al., "Poled polymers for frequency doubling of diode lasers" Proc. SPIE, vol 1337, pp 35 (1990)) using a photo-masking technique that causes a reduction of the chromophores in the material, can be employed to produce efficient waveguides in a preferred process according to the invention.

Gratings on waveguides for light coupling (including the Bragg-Grating discussed previously) have been studied for a number of years (Tamir, ed., "Topics in Applied Physics: Integrated optics", Springer Verlag, Vol. 7, page 92, (1979)), and coupling efficiencies of 80% or more have been achieved for passive couplers by the proper adjustment of waveguide layers and refractive index, n, and groove spacing of the grating, Λ. Making use of the second-order nonlinearity of the waveguides, the refractive index, n, across the grating can be changed by applying a field across the waveguide. This allows the coupling efficiency of the grating to be changed or adjusted. Such a device according to the invention provides an active grating-coupler that also can be employed as a light modulator, a light filter, or even a light valve.

In particular, the present invention desirably provides a methodology to fabricate "stacked" integrated optical circuits (i.e., circuits that are layered one on top of another instead of side-by-side, or in the same plane). Preferably such circuits are constructed using a unique laser-writing waveguide fabrication technique in accordance with the invention. A stacked device having two or more layers (especially having three layers) and which has independent waveguides and gratings in each layer is particularly preferred according to the invention. A variety of fabrication techniques can be employed to carry out construction of this device, e.g.,: (a) preferably utilizing index anisotropy caused by photo-induced chromophore orientations in 2°-NLO polymers (laser-writing) to fabricate the waveguide and the grating; (b) optionally utilizing the photobleaching process to fabricate the waveguide and the grating; and (c) optimally using a combination of these two techniques. The term "anisotropic" refers to a material whose electrical or optical properties are different for different directions of propagation or different polarizations of a traveling wave.

Figure 5:
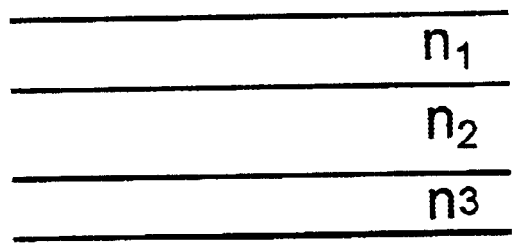
FIG. 5 is a diagram of a buffered waveguide and the corresponding differing refractive indices $n_1$, $n_2$, and $n_3$, that define each layer.

A device according to the invention can comprise one or more polymer layers as depicted in FIG. 5. FIG. 5 diagrams a waveguide where the refractive indices $n_1$, $n_2$, and $n_3$, are all different. The layers having these respective indices can comprise either air, buffer, and/or 2°-NLO. A "buffer" can be another polymer or any other material which: (1) has a lower refractive index than the guiding layer and light of the relevant range (i.e., range of chromophore excitation of chromophore employed in the device) passes through unaffected, (2) is employed to separate one layer from another layer or material (e.g., electrode), and (3) is noninterfering with the optical properties of layers above and/or below the buffer layer. Thus, a buffer layer can act merely as a separator and can be, for instance, a polymer such as polyimide, where the polymer (polyimide) does not contain any chromophor. In particular, preferably the buffer is polyimide, PMMA, or polystyrene that does not contain a chromophor.

Figure 9:
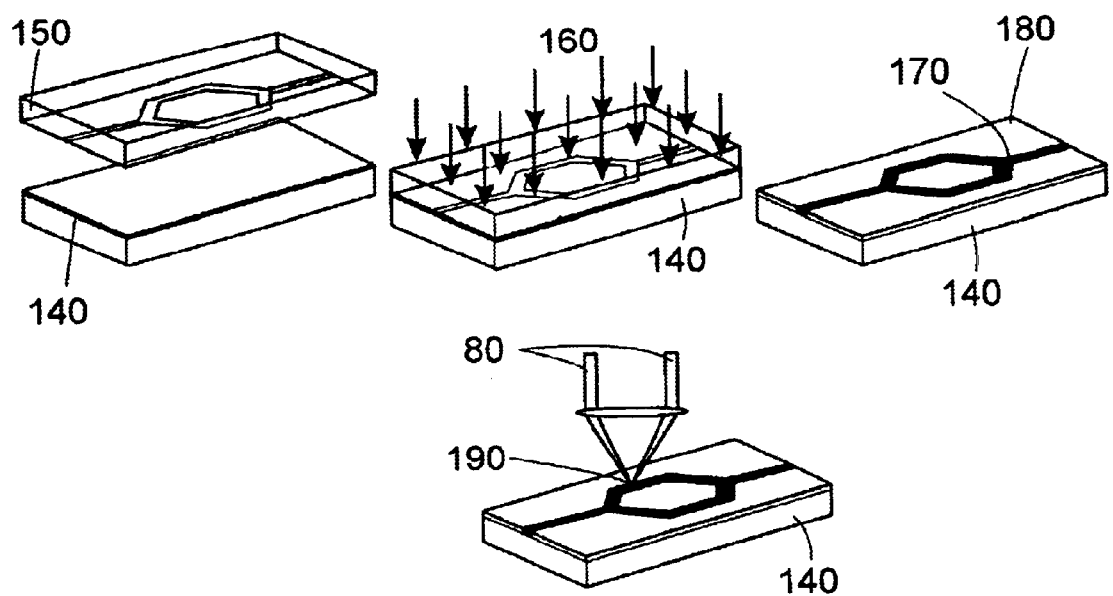
FIG. 9 shows photobleaching steps for waveguide fabrication and subsequent grating formation with use of laser beams. Symbols: 80, laser beam; 140, polymeric material; 150 metallic (e.g., quartz) mask; 160, irradiation; 170, unbleached waveguide; 180, bleached polymeric material; 190, grating formation.
Figure 11:
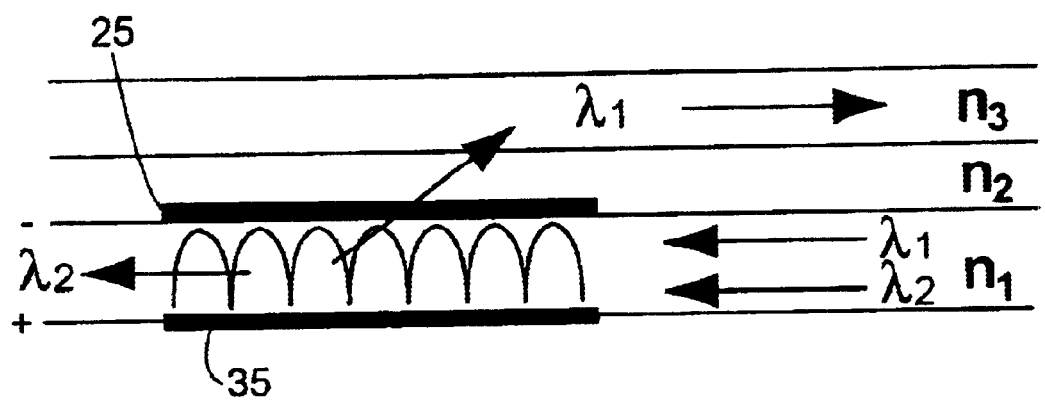
FIG. 11 diagrams an active three-layer device where $n_1$, and $n_3$ are the refractive indices of different second-order nonlinear optical polymers (e.g., polyimide-alkoxy sulfone diazo (Mordant Orange 10), polyimide-dialkyl amino nitro azo, and/or polyimide-dialkyl amino nitro diazo), $n_2$ is the refractive index of the buffer layer, and the refractive index can be changed by applying an electric field across the waveguide. Symbols: 25, top electrode (preferably transparent such as an ITO electrode or a very thin metal); 35, bottom electrode; λ1 and λ2, wavelengths; spiral, Braggs-Grating; +/−, applied electric field.

An especially preferred embodiment according to the invention is the active WDM device having the arrangement shown in FIG. 11. Thus, among other things, the present invention provides for an "active" Bragg-Grating WDM. Using the polymer with a sulfone diazo chromophore (FIG. 3), in a first method, the well established photobleaching method desirably can be used to write both the waveguide and the grating (FIG. 9). In a second method, preferably using the direct laser-writing technique, waveguides and gratings in a single-layer polymer can be constructed. Following construction of the single-layer systems, one or more additional polymer layers optionally can be added, and a device or system having two or more stacked polymer layers optionally can be constructed. To construct a second layer, or another layer (i.e., a third, fourth, fifth or other polymer layer), the underlying layer or layers (e.g., the first or other layer(s) constructed prior to the present layer being applied can be protected by a UV absorbing buffer layer such as polymethyl methacrylate (PMMA) or, with use of laser-writing techniques, e.g., employing a polymer which incorporates a different chromophore causing absorption at a different wavelength.

Following construction of a single layer device according to the invention, parameters such as stability, grating-index modulation depth, surface relief index modulation depth, and the effect of each parameter on the resonance condition for in and out-coupling efficiency of the guided wave are evaluated. These parameters confirm the optimal approach for fabrication of a multi-layer optical integrated circuit device capable of performing Wavelength Division Multiplexing (WDM), Add/Drop Multiplexing (OADM) and Cross-Connect (OXC) operations. The following accordingly is an outline of some of the physical and theoretical issues that are addressed in practicing and optimizing the invention (although each of the (7) steps below is not strictly necessary, just merely exemplary).

(1) Determination of materials for and synthesis of the suitable material for the waveguide. In particular, use of 2°-NLO polymers, particularly 2°-NLO polyimides (especially polyimide-dialkyl amino nitro azo, polyimide containing sulfone diazo, and polyimide-dialkyl amino nitro diazo) is preferred according to the invention, although other polymer chromophors also can be employed, e.g., as described herein. The proper solvents and concentrations for each material for spin-coating uniform, thin, films on glass substrates needs to be addressed. Generally, however, appropriate coating can be obtained with use of a polymer having a concentration of at least about 300 g/l of N-methyl pyrrole (NMP) or dimethylformamide (DMF). In general, for thick, uniform films, a high boiling point solvent is desirable. Typically according to the invention, the polymer is prepared e.g., in powder form. Subsequently the polymer is dissolved in a suitable solvent (e.g., NMP) and spin-coated on a surface, or adhered to the surface by any appropriate means known in the art. Procedures for precipitating the polymer as a powder, washing and drying the polymer, making a high concentration solution (e.g., in 1 to 2 ml of solvent) and spin coating (e.g., onto about a 1.5×1 inch surface, such as glass microscope slide) are known in the art (see, e.g., Saadeh et al., supra).

(2) Guided-wave structure design. A mathematical simulation of the guided wave conditions of different wave guide structures applied to 2°-NLO polymers desirably can be performed. Such simulation optionally takes into account the geometry and material properties such as the difference in the refractive indexes between poled and unpoled polymer films using the different poling methods (laser and corona). For fabrication of complicated circuits, this step may be required. Any appropriate simulation program known and available in the art can be employed (e.g., the product $BPM_{13}$ CAD, Optiwave Corp., ON, Canada; the product Beam Prop, R Soft, Inc., N.Y., N.Y.; and the product Thor/Prometheus, BBV Software BV, The Netherlands)

Figure 6:
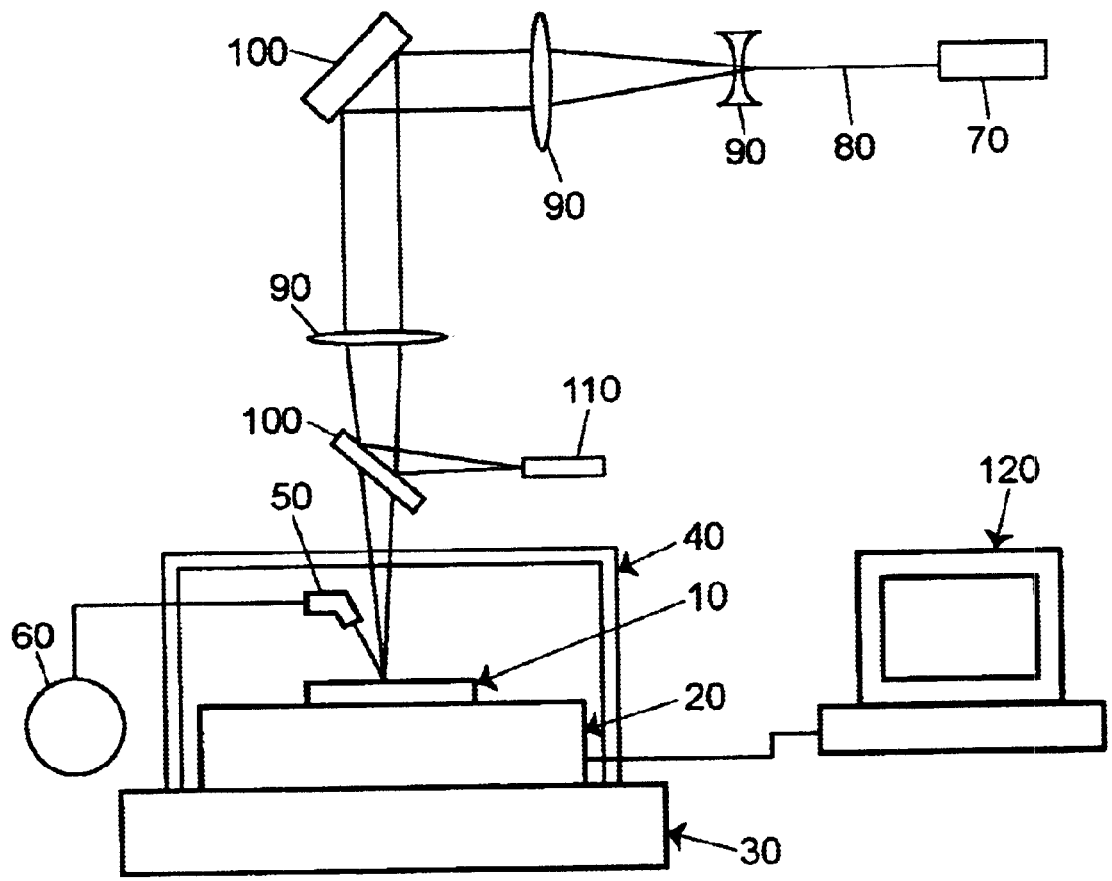
FIG. 6 is a diagram showing a preferred apparatus to be employed for waveguide fabrication by a direct laser writing technique. Symbol: 10, sample; 20, X-Y stage; 30, optical table; 40, nitrogen hood; 50, corona discharge; 60, high voltage supply; 70, laser; 80, laser beam; 90, lens; 100, mirror; 110, beam monitor; 120, computer.

(3) Construction of specialized apparatus (or modification of an existing apparatus) for waveguide fabrication and testing. As depicted in FIG. 6, a computer controlled precision X-Y stage apparatus is preferred for laser writing of waveguides, and subsequent testing of waveguides, although other means can be employed. The apparatus desirably can be constructed using commercially available, programmable, high-precision X-Y translation tables. Other components of the apparatus also are commercially available.

(4) Fabrication of waveguides using, for instance, laser-induced chromophore alignment and photobleaching technique. Also, the same techniques desirably can be employed to write surface-relief gratings in the highly nonlinear polymers with sulfone and diazo chromophores, and to measure the nonlinearity of the waveguide and diffraction efficiency of the fabricated gratings from outside and through the waveguide.

(5) Analysis of the waveguides (e.g., to determine the effectiveness of the laser-writing technique which induces chromophore alignment to produce index anisotropy) and examination of the gratings, desirably by Atomic Force Microscopy (AFM), or other appropriate means. Also, a determination can be made of the performance of the components fabricated with different methods such as photobleaching as compared with photo-induced poling, to determine the optimal means for fabrication of the components for a particular application.

(6) Fabrication of stacked waveguides using the same techniques as in (4) above. (7) Determining the multiplexing and coupling efficiency of the active devices according to the invention as compared to passive devices known in the art (as well as prepared according to the invention). Similarly, an assessment can be made of waveguide loss in the waveguide and through the grating of the novel devices according to the invention. This can be done, for instance, using prism-coupling, along with a near-field fiber-probe technique (which is well-known in the art). The measurements can be repeated for each layer present in a device according to the invention. This determination, of course, is done merely to optimize components for a particular application.

Thus, the present invention optimally provides for construction of a family of components and devices, based on the uniquely designed polymer waveguides according to the invention, which optionally combine the passive WDM of the Bragg-Grating with the nonlinearity of 2°-NLO polymers. In a preferred embodiment, an optical add-drop multiplexer is constructed which also has optical cross-connect properties.

The following Examples are by means of illustration, not limitation. Of course, variation of these Examples in the spirit and scope of the invention are contemplated herein.

Example 1

Exemplary Photo-Induced Birefringence Laser Writing in Waveguide Fabrication

This Example describes the theoretical basis underlying waveguide design according to the invention employing photo-induced birefringence laser writing, and particularly describes the theoretical bases for this use.

Polymer waveguides have been fabricated in a number of ways including by photolithography, and photo-crosslinking, among others. Photolithography is probably the most widely used because of the established techniques in the semiconductor industry. In the context of the present invention, photo-induced birefringence is employed to fabricate waveguides, optimally having the arrangement depicted in FIG. 5.

For the case in FIG. 5 where $n_1$ is very much less than $n_3$, e.g., $n_1$ is 1, and $n_3$, is 1.5 or greater (i.e., an asymmetric waveguide), the required refractive indices have the relationship in refractive index difference ($\Delta n$):

$$\Delta n = n_2 - n_3 \geq (2m_s+1)^2 \lambda_0^2/(32 n_2 t^2)$$

where t is the thickness of the waveguide, $\lambda_0$ is the vacuum wavelength and $m_s$ is the propagation mode, or guided wave mode) Hunsperger, "Integrated Optics: Theory and Technology", Third Edition, Springer-Verlag, New York. While $m_s=0$ is preferred according to the invention (lowest mode), higher modes are possible depending on structure, with $m_s=x$, where x is any whole number from 1 to infinity, and desirably, is any whole number from 1 to 10, especially from 1 to 4. Therefore for an asymmetric 3 $\mu$m thick sample at 1.3 $\mu$m wavelength, $\Delta n=0.003$ will suffice for single mode ($m_s=0$) confinement. This condition can be satisfied by photo-induced birefringence laser writing (e.g., Rochon et al. (1992), supra; Kim et al., supra). Increasing the waveguide thickness requires an even smaller An to satisfy the beam confinement condition.

Thus, for an asymmetric waveguide as depicted in FIG. 5, desirably $n_1<n_2$ and $n_3$ is $<n_2$. In FIG. 5, light is carried in the $n_2$ layer (i.e., the $n_2$ layer functions as the waveguide), for this to happen, the index of refraction $n_3$ and $n_1$ must be less than the index of refraction $n_2$.

For the case where $n_3=n_1$ (i.e., a symmetric waveguide), for waveguiding of a given mode to occur, the following index condition must be satisfied:

$$\Delta n = (n_2 - n_1) \geq \frac{m_s^2 \lambda_o^2}{4t^2(n_2 + n_1)}$$

where t, $\lambda_0$, and ms are as previously described. This condition for $\Delta n$ in the case of a symmetric waveguide is easily satisfied by the smallest difference between $n_1$ and $n_2$, a difference which clearly lies within the laser-induced birefringence limits (Yu et al., "Highly Stable Copolyimides for Second Order Nonlinear Optics; *Macromolecules; 29*, pages 6139–6142 (1996); Gharavi et al., "Fine-Tuning Optical Nonlinearity and Thermal Stability in Functionalized Co-polyimides", (presentation), *American Physical Society Meeting*, Mar. 18–22 (1996)).

Accordingly, this Example provides the theoretical basis for use of photo-induced bireflingence laser writing in construction of either an asymmetric or a symmetric waveguide according to the invention.

Example 2

Exemplary Direct Laser Writing in Waveguide Fabrication

This Example describes the use of direct laser writing in waveguide design according to the invention.

In particular, the direct writing is carried out using the cis-trans isomerization property of the property of the azo (e.g., polyimides depicted in FIG. 2) and diazo (e.g., polyimide depicted in FIGS. 1 and 3) chromophores excited at their peak absorption wavelengths, and assisted by a corona field. The absorption spectra of the chromophores sulfone diazo (present in polyimide containing sulfone diazo), dialkyl amino nitro azo (present in polyimide-dialkyl amino nitro azo), and dialkyl amino nitro diazo (present in polyimide-dialkyl amino nitro diazo) are depicted in FIG. 4, and are, respectively, from about 300 to 450 nm, from about 400 to about 500 mn, and from about 425 to about 600 nm. The differences in the absorption peaks apparently are due to the differing conjugation lengths and donor-acceptor groups at each end of the chromophores.

A direct laser writing of waveguides can be performed, for instance, using the apparatus depicted in FIG. 6 to achieve excitation of the different chromophores at their absorption maxima. As shown in FIG. 6, the sample (10) comprising the particular polyimide(s) layered on a solid surface such as silica or glass is mounted on an X-Y stage (20) present on an optical table (30). The X-Y stage is employed to follow the path of the waveguide. The entire structure of the X-Y stage and sample are placed in a nitrogen hood (40) to allow the onset of corona discharge (50) with use of the high voltage supply (60). The nitrogen hood is merely a transparent enclosure for confining the gas used for corona discharge (e.g, nitrogen, argon, helium, etc.), and further contains a port for entry of the laser beam to excite the chromophores. As depicted in FIG. 6, a laser (70) is employed to create the beam (80), which is then focused on the sample with use of one or more lenses (90) and mirrors (100), and is monitored by way of a beam monitor (110). The X-Y stage is controlled with use of computer (120), as depicted in FIG. 6.

Figure 7:
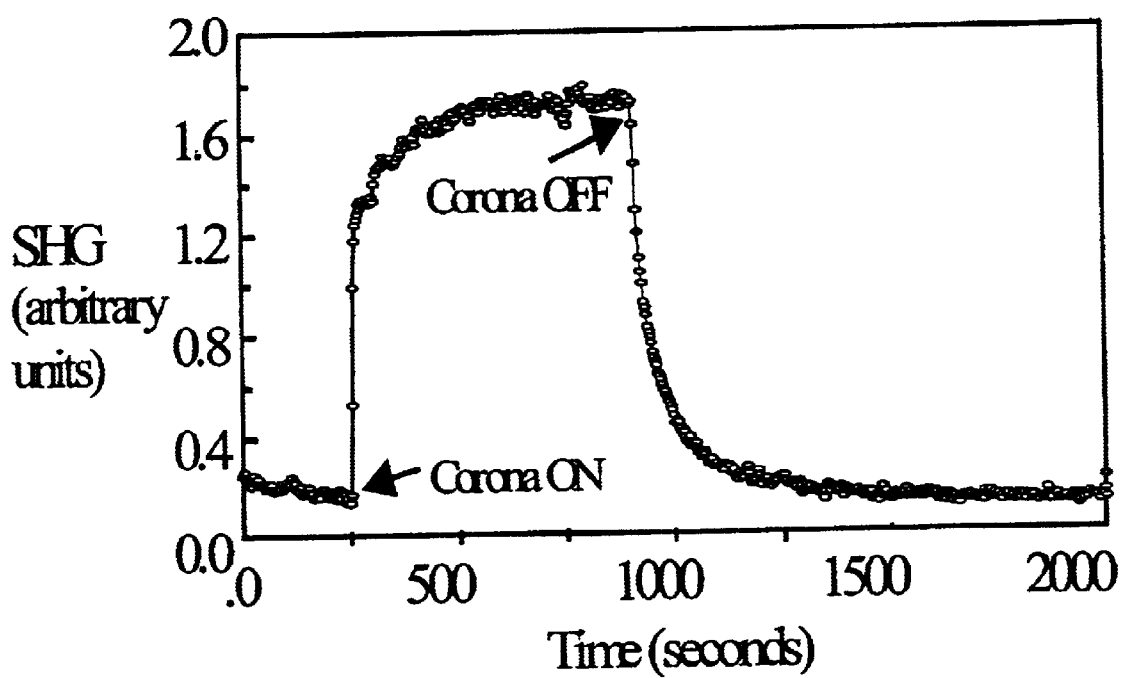
FIG. 7 depicts chromophore alignment of polyimide-dialkyl amino nitro diazo, which is measured by in situ second harmonic generation (SHG; arbitrary units from 0 to 2.0) at room temperature over the course of 2000 seconds, with the onset ("Corona ON") and termination ("Corona OFF") of corona discharge depicted.

Using the apparatus depicted in FIG. 6, the surface of the polymer will be charged at room temperature using a corona discharge under nitrogen atmosphere. Under the force of the external field of the charged surface, the chromophores will align along the field direction perpendicular to the plane of the film. At room temperature, however, this alignment will simply disappear due to the elasticity of the polymer matrix. This phenomenon is shown in FIG. 7, which depicts chromophore alignment of polyimide-dialkyl amino nitro diazo, as measured by in situ second harmonic generation (SHG; arbitrary units) at room temperature over the course of 2000 seconds (demonstrated at the University of Chicago, Doctors Alireza Gharavi and Luping Yu). As can be seen in FIG. 7, the intensity of the second harmonic light generation increases with the onset of corona discharge ("Corona ON") and falls off with the termination of corona discharge ("Corona OFF").

Multiple cis-trans isomerization accompanying excitation of the chromophores at their absorption maxima will overcome this elasticity, and will essentially "fix" the chromophore alignment in place. Thus, after tracing the waveguide pattern by the writing laser upon removal of the corona discharge field, the chromophores will remain aligned only in the laser-written pattern, and the waveguide will be formed.

Accordingly, this Example provides the use of direct laser writing in waveguide design according to the invention. Of course, given that polymers incorporating chromophores having different absorption maxima can be employed according to the invention, this method can be employed for the direct laser writing of stacked waveguides comprising more than one polymer layers.

Example 3

Holographic Grating Formation

This Example describes the formation of gratings in the polymer-based waveguides according to the invention by holographic means.

Gratings are formed by holographic means with use of two laser beams interfering at the 2°-NLO polymer. The period of the grating, A, is given by the following formula:

$$\Lambda = \frac{\lambda/n}{2\sin\alpha}$$

where α (depicted in FIG. 8) is the angle between the two intersecting beams, and n is the index of refraction of the material at the wavelength, λ (Yariv, *Optical Electronics*, Forth Edition, Saunders College Publishing, page 548, (1991)). Therefore, with the proper choice of λ and α, a grating can be written in the polymer material. If λ is in the UV range, such as with use of a nitrogen or excimer laser, the grating produced will be periodically bleached. By comparison, if λ is in the absorption range of the chromophore, so-called "surface relief "gratings are produced.

Thus, this example describes the manner by which gratings can be formed in the polymer-based waveguides of the invention Example 4

Exemplary Photobleaching in Waveguide Fabrication and Grating Formation

This Example describes the use of photobleaching in waveguide fabrication according to the invention. Such photobleaching has been successfully implemented for other polymer structures (Keil, supra; Rikken et al., "Poled Polymers for Frequency Doubling of Diode Lasers", *Proc. SPIE* 1337 (1990) 35).

This process of photobleaching is depicted in FIG. 9. Typically, a metallic mask (e.g., chromium coated quartz mask, (150)) is made by patterning the shape of the waveguide on a Cr-metal coated thin quartz slide using an etching technique, e.g., photolithography or excimer laser ablation. The mask also can be obtained commercially (Metrigraphics, Division of Dynamics Research Corporation, Wilmington, Mass. 01887). This mask is then placed on the surface of the polyimide film or other appropriate polymeric material (140), and irradiation (160) is carried out using ultraviolet light from a laser source such as a mercury lamp or a nitrogen or excimer laser. The waveguide is protected from UV radiation by the patterning on the mask, such that the chromophores are preserved in the region of the waveguide alone (170), and are destroyed outside the region of the waveguide (180). This causes a higher refractive index and thickness in the waveguide than in the UV-exposed regions of the polymer film (see, e.g., Ito et al., supra, Lindsay et al., supra, Edelman et al., supra). What results from this process is an unbleached waveguide (170), and bleached polymer (180) in the area surrounding the waveguide. In another step (described in Example 3) or other appropriate means, grating formation can be accomplished by creation of the grating using, for instance, a laser.

Accordingly, this Example provides the use of photobleaching in waveguide fabrication according to the invention.

Example 5

Exemplary Stacking of Multiple Layers in Waveguide Fabrication

This Example describes waveguide fabrication according to the invention by the stacking of multiple polymer layers.

To stack multiple waveguide layers and gratings, a device must be constructed one layer at a time. Fabrication needs to be carried out such that the fabrication of the top layer does not interfere with, or deleteriously effect, fabrication of the bottom layer, or other lower layers. Consequently, prior to the present invention, use of the photobleaching technique only could be employed for the bottom layer of multilayered devices, or for single layer devices, or for multilayered devices where the layers are employed in a side-by-side (i.e., non-stacked) position. By comparison, the laser writing technique of FIG. 6 as applied in the present invention is completely non-interfering with layers other than the layer being written.

For instance, a bottom layer can be constructed with polyimide containing sulfone diazo, which has an absorption maximum at about 386 nm (FIG. 4). The next layer could comprize either polyimide-dialkyl amino nitro azo or polyimide dialkyl amino nitro diazo, which each have an absorption maximum at a longer wavelength. A third layer, or other layers (if present), could comprise a polymer exhibiting a different absorption maxima than the polymers present in the other layers. Use of the polymers in this fashion has the net result that the fabrication of layers in addition to a first layer will not interfere with, or destroy, the structure of the first (bottom) layer, or other lower layers.

Thus, this Example provides a method of waveguide fabrication by the stacking of multiple polymer layers.

Example 6

Passive and Active Devices

This Example describes the construction of passive and active devices according to the invention.

Figure 10:
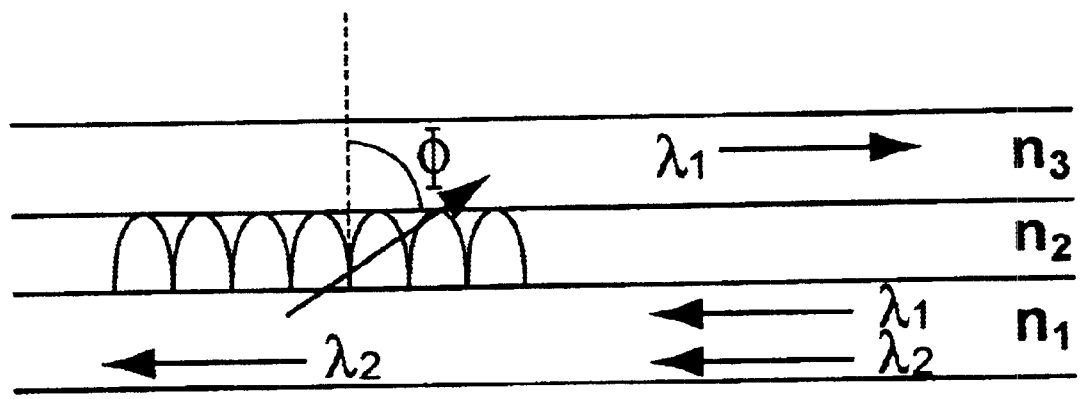
FIG. 10 diagrams a passive three-layer multiplexer that consists of two waveguides connected by a holographically bleached or "surface relief" grating. Symbol: $n_1$ and $n_2$ are the refractive indices of separate 2°-NLO polymers present on independent waveguides; and $n_2$ is the refractive index of buffer; spiral, Braggs-Grating.

FIG. 10 depicts a passive multiplexer according to the invention which consists of two waveguides ($n_1$ and $n_3$) connected by a holographic bleached or "surface relief" grating, and buffer ($n_2$). The configuration alternately could be either stacked or side-by-side. As set out in FIG. 10, two wavelengths enter as $\lambda_1$ and $\lambda_2$, and encounter a grating which is made to reflect one beam at a specific angle and then let all others pass through, such that $n_1$ is reflected at a specific angle (Ø) onto another waveguide, and passes through unimpeded. In FIG. 10, λ1 is reflected at an angle (i.e., the "angle of incident reflection" or "angle of reflection") such that it is accepted by the adjacent waveguide. A grating (as depicted in FIG. 10) is formed in the $n_2$ layer; the other possibility is that of a grating formed in the $n_1$, layer. If light has the appropriate angle it will be guided through the $n_3$ layer, if not, it will pass through. Therefore for a passive device, the angle of reflection must be precisely controlled by the material (i.e., grating period) and the nature of the material. The angle of reflection depends on the period of the grating and the refractive index of the medium. By comparison, for an active device, the angle of incident reflection can be adjusted by applying a voltage. Therefore in a passive device, just the path of light is changed, all other properties remain the same. There may be other side reflections of $\lambda_1$, e.g., at smaller intensities. These can be captured, e.g., in another device such as switch, etc., or can merely be ignored.

Figure 12:
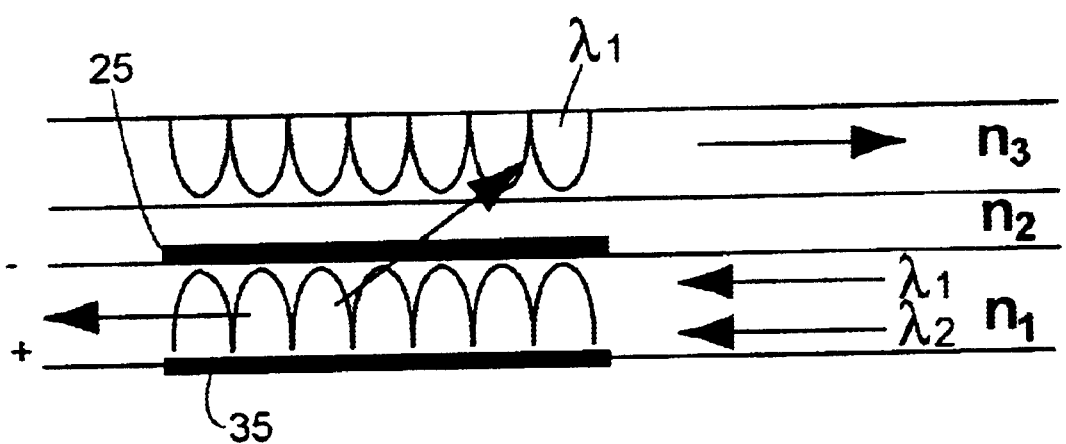
FIG. 12 diagrams a double grating "resonance matched" multiplexer, where $n_1$ and $n_3$ are the refractive indices of different second-order nonlinear optical polymers present in the layers (e.g., polyimide-alkoxy sulfone diazo (mordant Orange 10), polyimide-dialkyl amino nitro azo, and/or polyimide-dialkyl amino nitro diazo) and $n_2$ is the refractive index of a buffer layer. Symbols: 25, top electrode preferably transparent such as an ITO electrode, or a very thin metal); 35, bottom electrode λ1 and λ2, wavelengths; spiral, Braggs-Grating; +/−, applied electric field.

The method of the present invention also allows the fabrication of the active devices depicted in FIGS. 11 and 12. When the grating is in cladding (i.e., in buffer), an active device is not obtained, since the grating would not respond to an electric field. When the grating is in $n_1$, an active device is produced. This situation is described in FIG. 11. In this case, control of the angle of reflection is achieved by applying voltage. Voltage changes the refractive index of the 2°-NLO material. Thus, FIG. 11 depicts an active three-layer device where $n_1$, and $n_3$ are made of different 2°-NLO polymers (e.g., polyimide-alkoxy sulfone diazo, polyimide-dialkyl amino nitro azo, and/or polyimide-dialkyl amino nitro diazo) and the refractive index can be changed by applying a field across the waveguide. Desirably, with such a two layer device, the layers are made up of 2°-NLO polymers that include the sulfone diazo and nitro-diazo chromophores.

FIG. 12 depicts a double switch "resonance matched" multiplexer, where n, and $n_3$ are made of different 2°-NLO polymers (e.g., polyimide-alkoxy sulfone diazo i.e., modified (Mordant Orange 10), polyimide-dialkyl amino nitro azo, and/or polyimide-dialkyl amino nitro diazo).

In FIG. 12, both $n_1$, and $n_3$ are waveguides; both are active and both have gratings. This makes it easier to couple light into the other waveguide since there are two levels at which the angle of the incident reflection can be controlled. In both FIG. 11 and FIG. 12, $n_2$ is the index of refraction of a buffer layer. The gratings in the active devices in FIGS. 11 and 12 optimally are formed by holographic means. A passive device accordingly can be constructed consisting of a bleached grating formed as described above. The grating period, $\Lambda$, can be adjusted so that the angle of incident reflection (or angle of entry into another layer, labeled $\Phi_m$ in FIG. 10) matches the acceptance angle of the n waveguide (i.e., $n_2$ in FIG. 10). This concept of having a gratings properties (i.e., ability to reflect light at a particular angle) changed by an electric field is novel. The ability to control this angle provides for "tunability". It also is possible to control the intensity of the light that is switched by the optical switch of the invention.

Accordingly, this Example describes the manner by which passive and active devices can be formed according to the invention.

Example 7

Basic Grating-Coupler Theory in Waveguide Fabrication

This Example describes the theoretical basis of grating construction according to the invention.

The energy (e) of a guided wave is scattered by the harmonic perturbation of the waveguide by grating into space harmonic fields that vary according to the formula:

$$e^{i(k_{xv}x-\omega t)}$$

where x is the coordinate in the x direction, $\omega$ is the optical angular frequency, t is time, and $k_v$ is the planewave propagation factor in the medium. The value $k_{xv}$ is related to the grating period, $\Lambda$, according to the formula:

$$k_{xv}=\beta_v+i\alpha=\beta_0+(2v\pi/\Lambda)+i\alpha$$

where $\alpha$ is the waveguide constant, $\beta_v$ is the propagation factor of coupled light, $\beta_0$ is the surface wave propagation factor, and v is either 0 or any positive or negative whole number ranging from 1 to infinity, and desirably, is any whole number ranging from 1 to 0 (Tamir et al., "Analysis and Design of Granting Couplers", *Appl. Phys.* 14, 235–254 (1977)).

The grating-perturbed waveguide-modes have a set of spatial harmonics with z-direction propagation that is given by:

$$\beta_v = \beta_o + \frac{v2\pi}{\Lambda}$$

$$\beta_v = kn_1 \sin\Phi_m$$

where $\Phi_m$ is the angle that corresponds to the specific waveguide modes that propagate from the lower waveguide into the upper waveguide (Robert G. Hunsperger, *Integrated Optics: Theory and Technology*, Third Edition, page 101, Springer-Verlag (1991)), $\beta_0$ is the fundamental factor equal to $\beta_v$ for any particular mode in the waveguide away from the grating, and other variables are as described previously.

Therefore, for the passive multiplexer, the output angle for wavelength $\lambda_1$ in layer $n_1$ can be adjusted to the input coupling angle of the waveguide $n_3$; and because only a single beam into the upper layer is desired, $v=-1$ and the governing equations become:

$$kn_1 \sin\Phi_m = \beta_o - \frac{2\pi}{\Lambda}$$

where all variables are as previously described (Tamir et al.(1977), supra).

Based on the foregoing, it is feasible to stack layers of waveguides and gratings as shown in the active devices in FIG. 12 (and FIG. 11) to obtain wavelength selective coupling from one waveguide to another by the proper adjustment of $\Lambda$ and the refractive indices.

Furthermore, making use of the pockels effect, the refractive index of the 2°-NLO polymers can be changed by an applied external field according to the formula:

$$\Delta n_{TE} = n_{TE}^3 r_{13} E/2 \text{ and } \Delta n_{TM} = n_{TM}^3 r_{33} E/2$$

where $r_{13}$ is the electrooptic tensor coefficient, E is the applied electric field, $n_{TE}$ is the refractive index of transverse electric wave, $\Delta n_{TE}$ is the change in medium refractive index of transverse electric wave, $n_{TM}$ is the refractive index of transverse magnetic wave, $\Delta n_{TM}$ is the change in medium refractive index of transverse magnetic wave. (Levy et al., "Reflection Method for Electro-optical Coefficient Determination in Stratified Thin film structures", *Mol. Cryst. Liq. Cryst. Sci. Technol.—Sec. B: Nonlinear Optics*, 4, Pages 1–19 (1993); Reinisch et al., "Fast Pockels Light Modulator Using guided wave resonance", *Applied Optics*, 24, 2001 (1985)).

If the grating is designed for resonance coupling for the wavelength $\lambda$ and angle $\theta$, then a small bias across the grating will shift the resonance enough so that the coupling will not occur. If the grating is designed so that the coupling is slightly off resonance, a small bias across the grating will change the index of the 2°-NLO waveguide to "tune in" to the resonance condition for wavelength $\lambda$. This configuration, therefore, can act as a multiplexer or, conversely, demultiplexer.

This Example accordingly provides the theoretical basis of device construction (particularly grating construction) according to the invention.

Example 8: Exemplary Design Procedures in Waveguide Fabrication

This Example describes design procedures in waveguide fabrication according to the invention.

In view of the principles discussed in the preceding Examples, optimally the waveguide parameters such as desired thickness and width of the waveguide for a particular application are determined, as a first step. For the first layer of the polymeric material (e.g., comprised of sulfone diazo or other appropriate 2°-NLO), a waveguide is constructed on the substrate using the laser writing technique. The success of this step is determined by measuring the optical loss in the waveguide. For this stage, generally a loss of about 5 db/cm or less is tolerable. For a given wavelength and refractive index, the grating pitch are calculated according to the grating theory described in the earlier Examples. Surface-relief gratings can be written by the holographic technique shown in FIGS. 8 and 9. When at resonance, such gratings will dramatically increase the losses in the waveguide by leakage through the grating. This provides coupling action where one layer loses a wavelength as the other gains it. Upon the successful completion of the first layer, a transparent thin layer of conducting material such as indium-tin oxide (ITO) is deposited on the grating before the deposition of the second layer. The ITO layer can function as a transparent electrode.

Figure 13A:
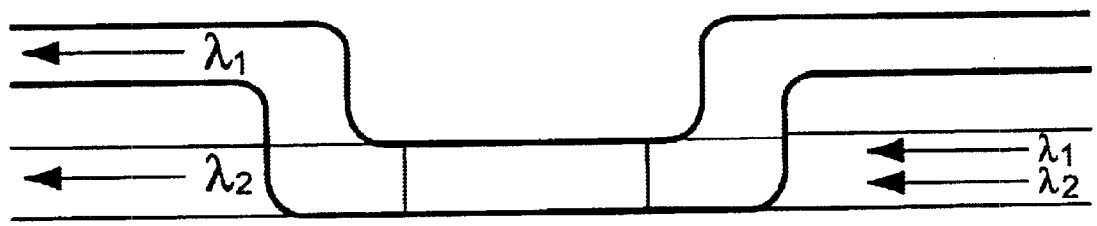
FIGS. 13A–B show an illustrative embodiment of the basic device configuration shown schematically in FIG. 11. With the top view depicted in FIG. 13A, and the side view depicted in FIG. 13B. Symbols: 25, top electrode preferably transparent such as an ITO electrode, or a very thin metal); 35, bottom electrode λ1 and λ2, wavelengths; spiral, Braggs-Grating; +/−, applied electric field; 250, solid support.
Figure 13B:
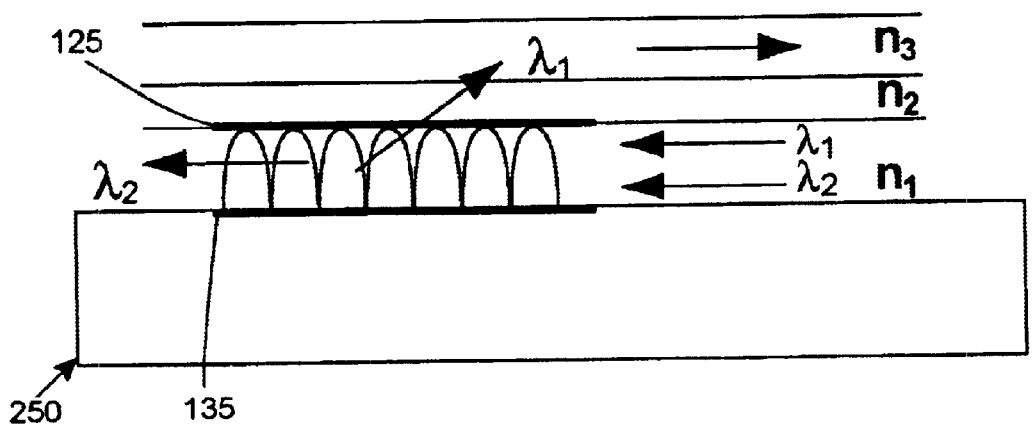

A second layer of the polymeric material with absorption further into the red region of the electromagnetic spectrum is constructed according to FIGS. 13A–B. The layers are engineered such that the light from the first grating exits with proper angle such that it couples into the top waveguide. Biasing the transparent electrode allows fine-tuning of the resonance condition. To increase the efficiency of light coupling between the waveguides, a grating with a pitch calculated from the equations described in the preceding Example is written in the top grating according to the resonance conditions. This resonance condition is determined by the emerging angle of the light from the first grating. This angle can be measured experimentally.

In the passive/active multiplexer with "resonance matched" double grating configuration, as shown in FIG. 12, the top ($n_3$) and the bottom ($n_1$) each consist of different 2°-NLO polymers. These chromophores have absorption peaks that are far enough apart to only effect one polymer material at a time during laser-writing of waveguides. It is then possible to efficiently write surface-relief gratings independently.

This example accordingly describes design procedures for waveguide fabrication according to the invention.

Examlple 9

Exemplary Coupling Techniques

This example describes coupling techniques according to the invention.

Prism couplers are also frequently used for the input or output coupling of signals into the waveguide layers. As an input coupler, efficiencies between 80 to 100% have been achieved using prism couplers. Each coupled mode is launched at a specific incident angle. Therefore, it is possible to launch a specific guided mode in the waveguide with use of a prism coupler. Accordingly, as an output coupler, each guided mode will exit at a specific angle.

This method thus provides the use of prisms in coupling techniques that can advantageously be employed in the invention.

Example 10

Exemplary Applications and Uses

The products and processes that comprise the invention advantageously can be applied to many uses, more than are recited herein, and such as would be apparent to one skilled in the art. However, the foregoing description and Examples provide the necessary inventive rudiments allowing (with ordinary skill and knowledge in the art) the establishment of the detailed procedures needed to fabricate waveguides and micro-electrooptic components including, but not limited to, customized gratings to perform a specific task. This paves the way for fabrication of optical integrated circuits. The invention allows determination of the composition-process relationship of the polymeric material used to increase fabrication efficiency. This allows development of multiplexers/demultiplexers and other devices.

The potential use of a compact, inexpensive, active multiplexer/demultiplexer, and other devices as described herein is readily evident. Their use in the private sector will range from communication and information systems, to future optical switching and computing, to display panels.

A sample preferred embodiment is set out in FIG. 14. This is a 4×4 multiplexer/demultiplexer and cross-connect device according to the invention. The device comprises an optical circuit board (210) having one or more than one (e.g., potentially millions) of optical switches, electrical connections (220) for supplying voltage, input optical fibers (230) to the circuit board, and output optical fibers (240) from the circuit board.

All of the references cited herein are hereby incorporated in their entireties by reference.

While this invention has been described with an emphasis upon a preferred embodiment, it will be obvious to those of ordinary skill in the art that variations in the preferred composition and method may be used and that it is intended that the invention may be practiced otherwise than as specifically described herein. Accordingly, this invention includes all modifications encompassed within the spirit and scope of the invention as defined by the following claims.

What is claimed is:

1. In an optical switch, the improvement comprising the inclusion of a plurality of layers each comprising an optical nonlinear second-order polymer, wherein the optical nonlinear second-order polymer present in each layer differs from that present in any other layer in terms of its absorption maximum.

2. An optical switch comprising:

(a) at least two layers that each comprise an optical waveguide made of an optical nonlinear second-order polymer; and (b) at least one grating, with the proviso that the optical nonlinear second-order polymer present in each layer differs from that present in any other layer in terms of its absorption maximum.

3. The optical switch according to claim 2, wherein said switch is a device selected from the group consisting of an optical wavelength division multiplexer, an optical wavelength division demultiplexer, an optical add/drop multiplexer, and an optical inter-connect device.

4. The optical switch according to claims 2, wherein said switch has the structure

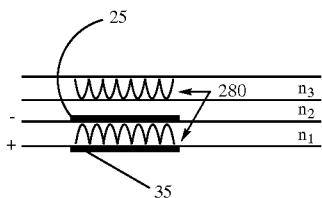

comprising said two layers ($n_1$ and $n_3$) that each comprise an optical waveguide, a cladding layer comprised of buffer ($n_2$), a first grating (280), and a second grating (280) which is flanked by a top electrode (25) and a bottom electrode (35).

5. The optical switch according to claim 2, wherein said switch comprises:

(a) two layers that each comprise an optical waveguide made of an optical nonlinear second-order polymer; and (b) one grating.

6. The optical switch according to claim 2, wherein said switch comprises:

(a) two layers that each comprise an optical waveguide made of an optical nonlinear second-order polymer; and (b) two gratings.

7. The optical switch according to claim 2, wherein said switch is active.

8. The optical switch according to claim 2, wherein said switch is passive.

9. The optical switch according to claim 2, wherein said switch further comprises one or more cladding layers.

10. The optical switch according to claim 2, wherein the angle at which said grating transfers optical signals from one waveguide to another can be controlled.

11. The optical switch according to claim 2, wherein the intensity of the optical signal which said grating transfers from one waveguide to another can be controlled.

12. The optical switch according to calim 9, wherein said one or more cladding layers comprise at least one grating.

13. The optical switch according to claim 2, wherein said layers are stacked.

14. The optical switch according to claim 1, wherein said layers are separated from each other by either a grating or a cladding layer.

15. The optical switch according to claim 2, wherein said optical nonlinear second-order polymer is a polymer that has the structure

Z—S—C wherein Z is a polymer backbone, S is a spacer attached to Z, and C is an optical nonlinear second-order chromophore attached to S.

16. The optical switch according to claim 2, wherein said optical nonlinear second-order polymer is a polymer that has the structure

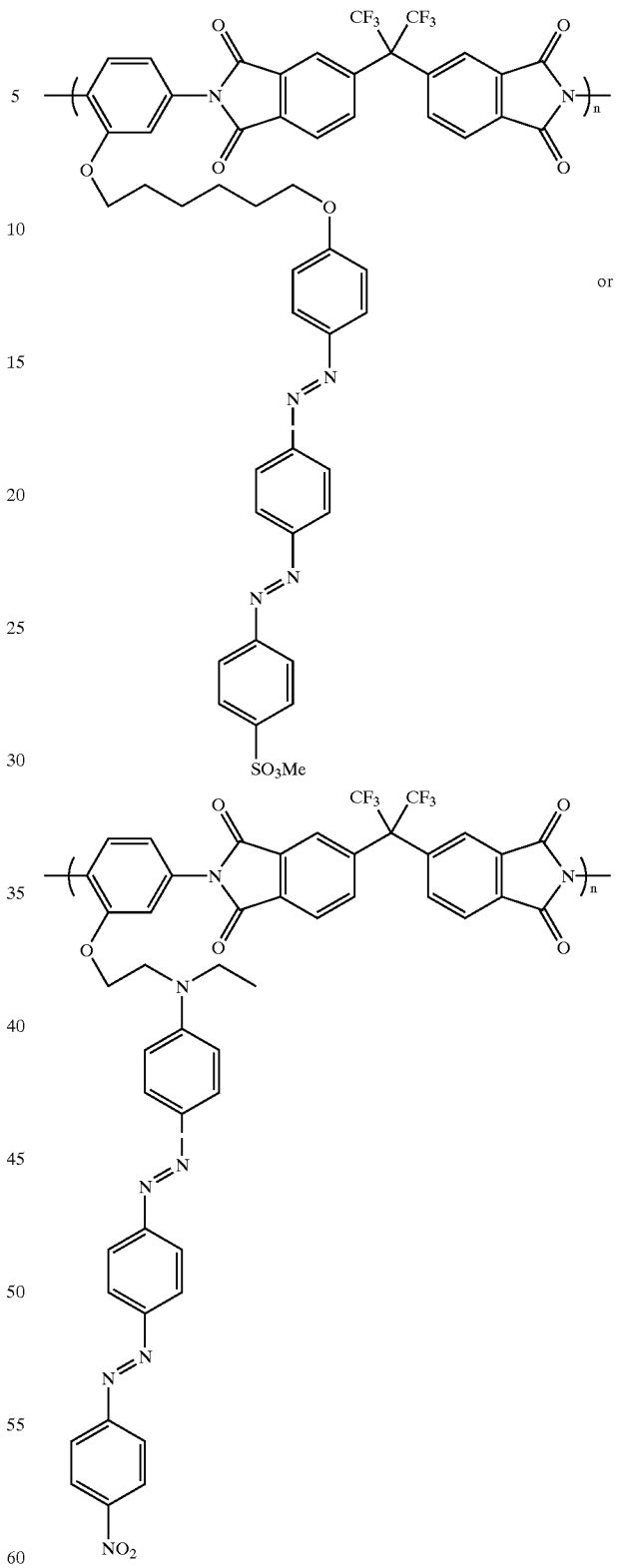

or wherein ranges from about 44 to about 600.

17. The optical swvitch according to claim 2, wherein said optical nonlinear second-order polymer is a polymer doped with a chromophore.

18. A method of transmitting an optical signal in an optical switch according to claim 2, said method comprising switching said signal from one waveguide to another by virtue of changing the refractive index of a said grating through which said signal is transmitted by application of an electric field.

19. A method of transmitting an optical signal, said method comprising use of an optical switch according to claim 2.

20. The optic switch according to claim 15, wherein Z is

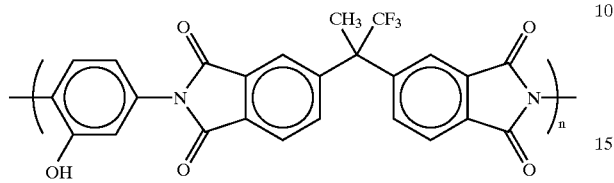

wherein ranges from about 44 to about 600.

21. The optic switch according to claim 15, wherein Z is selected from the group consisting of Poly(methyl methacrylate), Polystyrene, Poly(p-hydroxystyrene), Polycarbonate, Polyester, Polyurethane, Poly(phenylene vinylene), Polyquinoline, Polyamide, Polyamic Acid, and Polyimide.

22. The optic switch according to claim 15, wherein S is a carbon chain comprising from 0 to 30 atoms.

23. The optic switch according to claim 15, wherein S is a carbon chain comprising from 2 to 6 atoms.

24. The optic switch according to claim 15, wherein C is selected from the group consisting of sulfone diazo, dialkyl amino nitro azo, and dialkyl amino nitro diazo.

25. The optic switch according to claim 15, wherein C is a chromophore selected from the group of chromophores consisting of

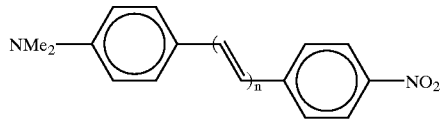

wherein n is 2, 3, or 4,

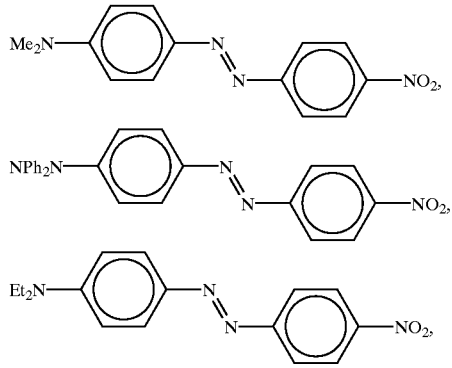

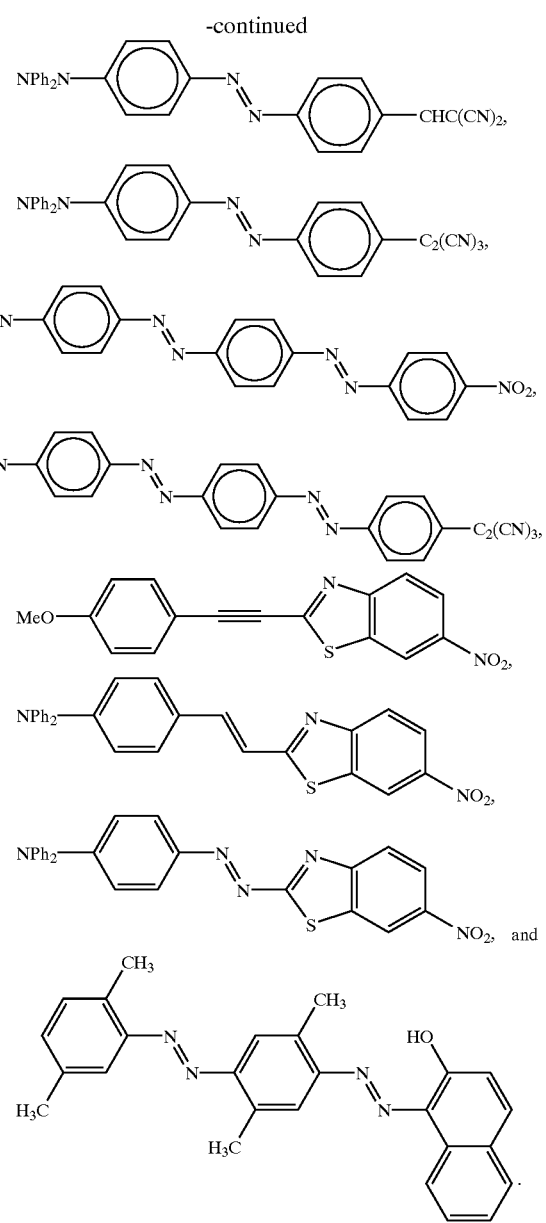

26. The optic switch according to claim 2, wherein said switch comprises a means for applying an electric field to said grating.

27. The optic switch according to claim 6, wherein said switch comprises a means for applying an electric field to one of said two gratings.

28. The optic switch according to claim 6, wherein said switch comprisesa means for applying an electric field to both of said two gratings.

* * * * *

UNITED STATES PATENT AND TRADEMARK OFFICE
CERTIFICATE OF CORRECTION

PATENT NO.    : 6,661,942 B1                              Page 1 of 1
DATED         : December 9, 2003
INVENTOR(S)   : Alireza Gharavi It is certified that error appears in the above-identified patent and that said Letters Patent is hereby corrected as shown below:

Column 25,
Line 46, after "according to" please delete "calim" and insert -- claim -- in its place.

Column 26,
Line 62, please delete "wherein ranges" and insert -- wherein n ranges -- in its place.
Line 63, after "The optical" please delete "swvitch" and insert -- switch -- in its place.

Column 27,
Line 2, after "refractive index" please delete "of a said grating" and insert -- of said grating -- in its place.

Column 28,
Line 56, after "switch" please delete "comprisesa" and insert -- comprises a -- in its place.

Signed and Sealed this

Sixth Day of April, 2004

JON W. DUDAS
*Acting Director of the United States Patent and Trademark Office*